(12) United States Patent
Chen et al.

(10) Patent No.: US 8,260,826 B2
(45) Date of Patent: Sep. 4, 2012

(54) DATA PROCESSING SYSTEM AND METHOD

(75) Inventors: Qiming Chen, Cupertino, CA (US); Meichun Hsu, Los Altos Hill, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 42 days.

(21) Appl. No.: 12/907,940

(22) Filed: Oct. 19, 2010

(65) Prior Publication Data
US 2012/0078975 A1 Mar. 29, 2012

Related U.S. Application Data

(63) Continuation-in-part of application No. 12/888,427, filed on Sep. 23, 2010.

(51) Int. Cl.
*G06F 17/30* (2006.01)
(52) U.S. Cl. .......................................... 707/803
(58) Field of Classification Search .................. 707/714, 707/738, 803; 709/223
See application file for complete search history.

(56) References Cited

U.S. PATENT DOCUMENTS

| | | | |
|---|---|---|---|
| 6,519,604 B1 * | 2/2003 | Acharya et al. ............... | 707/738 |
| 7,403,959 B2 | 7/2008 | Nishizawa et al. | |
| 2009/0106214 A1 | 4/2009 | Jain et al. | |
| 2009/0271529 A1 | 10/2009 | Kashiyama et al. | |
| 2009/0287628 A1 | 11/2009 | Indeck et al. | |
| 2010/0250572 A1 | 9/2010 | Chen et al. | |
| 2011/0131198 A1 * | 6/2011 | Johnson et al. ............... | 707/714 |

OTHER PUBLICATIONS

Sergio D. Servetto, "Lattice Quantization with Side Information: Codes, Asymptotics, and Applications in Sensor Networks," Aug. 31, 2006 (available as of Oct. 18, 2010 at http://cn.ece.cornell.edu/publications/papers/20020308/pp.pdf).

Elena Tolkova, "Compression of Most Propagation Database," National Oceanic and Atmospheric Administration, Technical Memorandum OAR PMEL-134, Mar. 2007.

Ming-Chien Shan et al., "Business Process Flow Management and its Application in the Telecommunications Management Network," Hewlett-Packard Journal, Oct. 1996 (available as of Oct. 18, 2010 at http://www.hpl.hp.com/hpjournal/96oct/oct96a8.pdf).

Qiming Chen et al., "Experience in Extending Query Engine for Continuous Analytics," Tech Rep HP Laboratories -2010-44, May 21, 2010 (available as of Oct. 18, 2010 at http://www.hpl.hp.com/techreports/2010/HPL-2010-44.pdf).

Meichun Hsu et al., "Generalized UDF for Analytics Inside Database Engine," LNCS (Lecture Notes in Computer Science) vol. 6184, pp. 742-754, from WAIM (Web-Age Information Management) 2010 Conference proceedings Jul. 15-17, 2010 (Support for Jul. 15-17, 2010 date at Document PP).

(Continued)

*Primary Examiner* — Etienne Leroux

(57) ABSTRACT

A system and method for processing data are described. The method quantizes a portion of data processed at a first node within a distributed database processing system to generate one or more quantization tuples, aggregates the tuples at the node to create a plurality of aggregated tuples, and transmits the aggregated tuples to a second node within the distributed database processing system.

20 Claims, 10 Drawing Sheets

OTHER PUBLICATIONS

Qiming Chen et al. "Efficiently Support MapReduce-like Computation Models Inside Parallel DBMS," Proc. Thirteenth International Database Engineering & Applications Symposium (Ideas'09), Sep. 16-18, 2009.

Qiming Chen et al., "Extend UDF Technology for Integrated Analytics", Proc., LNCS vol. 5691, pp. 256-270, from DaWak Conference proceedings, Aug. 31-Sep. 2, 2009 (Support for Aug. 31-Sep. 2, 2009 date at Document QQ).

Qiming Chen et al., "Data-Continuous SQL Process Model," LNCS vol. 5331, pp. 175-192, from OTM 2008 Conferences proceedings (Part I), Nov. 9-14, 2008 (Support for Nov. 9-14, 2008 date at Document RR).

Arvind Arasu et al., "STREAM : The Stanford Data Stream Management System," Department of Computer Science, Stanford University, 2004 (available as of Oct. 18, 2010 at http://ilpubs.stanford.edu:8090/641/1/2004-20.pdf).

Tasso Argyros, "How Aster In-Database MapReduce Takes UDF's to the Next Level," Aug. 27, 2008, (available as of Aug. 30, 2010 at www.asterdata.com/blog/index.php/2008/08/27/how-asters-in-database-mapreduce-takes-udfs-to-the-next-level/).

Ron Avnur et al., "Eddies: Continuously Adaptive Query Processing," University of California, Berkeley, 2000 (available as of Oct. 18, 2010 at http://db.cs.berkeley.edu/papers/sigmod00-eddy.pdf).

Neil Conway, "An Introduction to Data Stream Query Processing," Truviso, Inc., May 24, 2007. (available as of Oct. 18, 2010 at http://neilconway.org/talks/stream_intro.pdf).

Seth Grimes, "In-Database Analytics: A Passing Lane for Complex Analysis," Intelligent Enterprise, Dec. 2008 (available as of Oct. 18, 2010 at http://intelligent-enterprise.informationweek.com/showArticle.jhtml;jsessionid=4PCQYI12DP2JPQE1GHPCKH4ATMY-32JVN?articleID=212500351).

Nikos Koudas et al., "Data Stream Query Processing," University of Toronto and AT&T Labs-Research, Sep. 4, 2005 (available as of Oct. 18, 2010 at http://queens.db.toronto.edu/~koudas/docs/stream-final.pdf).

Hewlett-Packard Company, "Neoview Owner's Manual," (HP Part No. 541592-005), Mar. 2007.

Naresh Rapolu et al., "Transactional Support in MapReduce for Speculative Parallelism," Department of Computer Science, Purdue University, Mar. 2010 (available as of Oct. 18, 2010 at http://www.cs.purdue.edu/research/technical_reports/2010/TR%2010-001.pdf).

Sys-Con Media Inc., "Java Feature—Building Real-Time Applications with Continuous Query Technology," Aug. 28, 2006 (available as of Dec. 20, 2010 at http://java.sys-con.com/node/260054/ and http://java.sys-con.com/node/260054?page0,1).

Brandyn White et al., "Web-Scale Computer Vision using MapReduce for Multimedia Data Mining," ACM MDMKDD'10, Jul. 25, 2010, Washington, DC.

Andrew Witkowski et al., "Continuous Queries in Oracle," ACM VLDB 2007, Sep. 23-28, 2007, Vienna, Austria.

Damian Black, "Relational Asynchronous Messaging: A New Paradigm for Data Management & Integration," Jan. 2007.

SQL Stream, Product Page (SQL Stream Ramms) as of Jun. 13, 2008, SQL Stream Incorporated (available as of Dec. 20, 2010 at https://web.archive.org/web/20080613332512/www.sqlstream.com/products/productoffersRAMMS.htm).

Hewlett-Packard Company, "HP Neoview Enterprise Data Warehousing Platform," Apr. 1, 2007 (available as of Oct. 18, 2010 at http://www.hp.com/hpinfo/newsroom/press_kits/2007/business-technology/brochure_neoview4AA0-7932enw.pdf?jumpid=reg_R1002_USEN).

Arvind Arasu et al., "The CQL Continuous Query Language: Semantic Foundations and Query Execution," VLDB Journal 15(2), pp. 121-142, 2006 (Published on-line Jul. 22, 2005).

Sirish Chandrasekaran et al., "TelegraphCQ: Continuous Dataflow Processing for an Uncertain World," CIDR Conf. 2003.

J. Dean, "Experiences with MapReduce, an Abstraction for Large-Scale Computation," Powerpoint Presentation, 2006 (available as of Oct. 18, 2010 at http://www.cs.virginia.edu/~pact2006/program/mapreduce-pact06-keynote.pdf).

J. Dean, "Experiences with MapReduce, an Abstraction for Large-Scale Computation," International Conf on Parallel Architecture and Compilation Techniques. ACM PACT 2006 (Abstract), Seattle, Washington (Sep. 16-20, 2006).

D.J. DeWitt et al., "Clustera: An Integrated Computation and Data Management System," ACM PVLDB '08, Aug. 23-28, 2008, Auckland, New Zealand.

Usama M. Fayyad et al., "Multi-Interval Discretization of Continuous-Valued Attributes for Classification Learning," Sep. 1, 1993, Chambery, France (available as of Oct. 18, 2010 at http://trs-new.jpl.nasa.gov/dspace/bitstream/2014/35171/1/93-0738.pdf) (Support for Sep. 1, 1993 date at Document SS).

Michael J. Franklin et al., "Continuous Analytics: Rethinking Query Processing in a Network Effect World," CIDR 2009, Asilomar, California (4th Biennial Conference on Innovative Data Systems Research), Jan. 4-7, 2009.

Bugra Gedik et al., "SPADE: The System S Declarative Stream Processing Engine," ACM SIGMOD 2008 (Jun. 9-12, 2008) Vancouver, BC.

Erietta Liarou et al., "Exploiting the Power of Relational Databases for Efficient Stream Processing," ACM EDBT 2009, Saint Petersburg, Russia, Mar. 24-26, 2009.

R.E. Bryant, "Data-Intensive Supercomputing: The case for DISC," Carnegie Mellon University CS-07-128, May 10, 2007.

R. Chaiken et al., "SCOPE: Easy and Efficient Parallel Processing of Massive Data Sets," ACM VLDB 2008, Auckland, New Zealand (Aug. 24-30, 2008).

Hung-chih Yang et al. "Map-Reduce-Merge: Simplified Relational Data Processing on Large Clusters," ACM SIGMOD 2007, Beijing, China (Jun. 12-14, 2007).

Greenplum, "Greenplum MapReduce for the Petabyte Database," 2009.

Greenplum, "A Unified Engine for RDBMS and MapReduce," Oct. 6, 2008 (Whitepaper) (Support for Oct. 6, 2008 date at Document TT).

Webpage from www.springer.com to support Jul. 15-17, 2010 date for Document J (available Dec. 20, 2010 at www.springer.com).

Webpage from www.springer.com to support Aug. 31-Sep. 2, 2009 date for Document L (available Dec. 20, 2010 at www.springer.com).

Webpage from www.springer.com to support Nov. 9-14, 2008 date for Document M (available Dec. 20, 2010 at www.springer.com).

NASA Jet Propulsion Laboratory, "BEACON eSpace" Website page to support Sep. 1, 1993 date for Document GG ("Fayyad, et al.") (available as of Oct. 18, 2010 at http://trs-new.jpl.nasa.gov/dspace/handle/2014/35171).

Beye Network, Website page to support Oct. 6, 2008 date for Document OO (available as of Oct. 20, 2010 at http://www.b-eye-network.com).

* cited by examiner

DATA PROCESSING SYSTEM AND METHOD

CROSS-REFERENCE TO RELATED APPLICATIONS

This application is a continuation-in-part of and claims the benefit of co-pending U.S. patent application Ser. No. 12/888,427, entitled "A Query Rewind Mechanism for Processing a Continuous Stream of Data", filed on Sep. 23, 2010. The entire application is expressly incorporated by reference into the present application as if fully stated herein.

BACKGROUND

In many business and non-business fields, large computing systems exist where massive data is continuously produced. Business Intelligence (BI) is one area where fast data processing is desired. BI developers create data "mining" and analysis tools to facilitate business decision making. For example, in telecommunications, BI applications based on call-detail record (CDR) analysis (such as applications for intelligent charging, customer behavior analysis and fraud detection) are considered important tools. Hundreds of millions of CDRs, each containing details of calls passing through system exchanges, for example, are created every minute in some telecommunications systems. Creating BI applications with low latency to process massive amounts of data, such as CDR record streams, is a formidable task.

Sensing and monitoring systems are other examples of systems where massive data is produced and low latency analysis is desired. A scientific monitoring system, such as one to track vehicle exhaust output, may create huge amounts of sensor reading data.

For systems generating large amounts of data, there is great interest in low latency processing and analysis of the generated data.

Figure 1A:
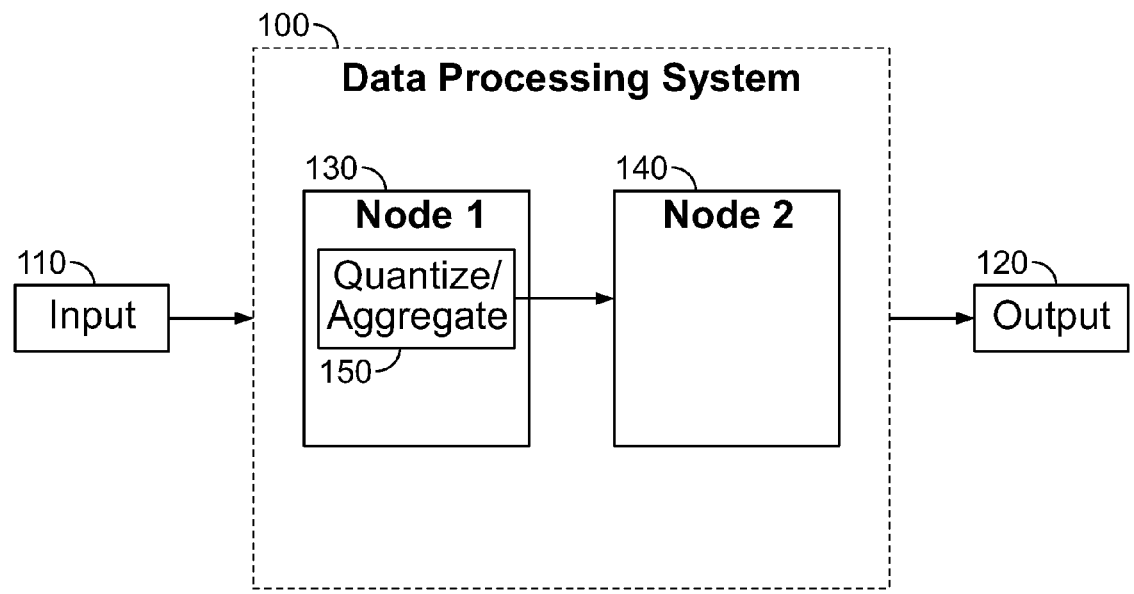
FIG. 1A is a conceptual illustration of a data processing system according to embodiments of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

In different embodiments, the present invention may provide a system and method for processing data, where a processing node in a distributed and/or parallel process quantizes data (e.g. to produce quantization tuples) and then aggregates the quantized data at the node to yield a reduced data set (e.g. a reduced set of aggregated tuples) before sending the reduced data set to another node for further processing.

The technique of quantizing and aggregation can be employed in a variety of distributed and/or parallel processing database applications where discretization and abstraction of data may be desired for data reduction and/or network data movement reduction. Such an approach may also provide useful improvements on currently-available techniques for the processing of both bounded data, which comes in fixed sets (like the set of words in a book), and data streams, which comes in continuous "infinite" flows (like records generated continuously in a stock trading system or a telecommunications system).

For example, Map-Reduce (M-R) is a programming model currently known that supports parallel computations over vast amounts of data on large clusters of computing machines. M-R has been implemented in systems as "Google M-R" and "Hadoop M-R". While the current M-R model may enhance the processing of large quantities of data by a "divide-and-conquer" strategy implemented by dividing the data into portions or "chunks" and processing it on parallel-processing computer installations, M-R is not traditionally defined on unbounded streams of data. Since M-R does not traditionally apply to unbounded data, problems (such as scalability issues) may exist for the creation of large-scale M-R systems for processing stream data. As applied in a map-reduce process, for example) the technique of quantization and aggregation between nodes of a distributed (and/or parallel) process according to embodiments of the invention may provide a processing advantage over currently available systems.

As the technique of quantization and aggregation according to embodiments of the invention is a general technique, and not tied to a specific process (like map-reduce), the technique may also have application in other commercially-available database processing systems such as in "Operational Data Store" and "Enterprise Data Warehouse" systems (where the potential for low latency or "real time" analysis in the processing of bounded data may be limited, because the data transfer between network and warehouse is seen to be currently time consuming) and in "data stream management systems" (where, because those systems are currently built separately from the database engines used to store and access database information, latency issues may arise when stream processing results need to be "persisted" (e.g. saved to a database) or when dynamic stream data and static data stored in a database need to be used in combination). The approach of quantization and aggregation in a distributed database processing environments according to embodiments of the present invention applies to both bounded and stream data and can be used to for example improve latency in a distributed (and/or parallel) processing database systems in general.

In different applications, the records processed in embodiments of the present invention may come from either bounded data sets or unbounded data streams. The records may be ordered lists of data elements known as "tuples". The data quantized in the records may be continuous-value data. Other data such as discrete or non-continuous data may be mapped to continuous-value relations and also processed as continuous-value data.

Continuous-value data may include data taking any possible value within a range. For example, the height of a person can be any value with in the range of values known for human height. A "height" field within a record (for a person), in this example, would then contain continuous-value data that may be quantized. Continuous-value data may be contrasted against discrete-value data, which may represent data that can have only specific values. For example, the number of children in a family represents a type of discrete-value data, because it is not possible to have half or three-quarters of a child. Thus, only discrete integer values (e.g. 0, 1, 2, 3...) are available for identifying the number of children in a family.

Physical measurement data is in general continuous-value data that may be readily quantizable. Other types of data, such as time, stock price, income, etc., may also represent continuous-value data which may be quantized.

Quantizing is a process of approximating (or "mapping") a continuous range of values to a smaller (more "finite") set of discrete symbols or integer values. As an example of quantization, it may be possible to have a number of records showing start times and end times for an activity, such as streaming a video on a computer network. Records may have information such as:

| Video | Start time | End time |
|-------|------------|----------|
| <v1,  | 06:57:00,  | 07:00:04> |
| <v1,  | 06:58:32,  | 07:00:10> |
| <v1,  | 06:58:59,  | 07:01:23> |
| <v1,  | 06:59:27,  | 07:01:46> |

Each of the start and end times can be mapped in this example to a quantum value based on the hour. For example, the record<v1, 06:57:00, 07:00:04> may map to:
   <v1, 6, 180> and <v1, 7, 4>
where the 180 reflects a streaming period of 180 seconds during the $8^{th}$ hour ($8^{th}$ quanta) and a period of four (4) seconds in the $7^{th}$ hour ($7^{th}$ quanta). All of the records above when quantized may map to a set of tuples (which may be called "quantization tuples" or "quanta records") as follows:

| | |
|---|---|
| < v1, 6, 180> | <v1, 7, 4> |
| < v1, 6, 88> | <v1, 7, 10> |
| < v1, 6, 61> | <v1, 7, 83> |
| < v1, 6, 33> | <v1, 7, 106> |

Each start time and end time may map to a quanta value, here, either 6, or 7. Also, for each mapping there is a duration value, such as the 180 seconds of time for hour 6 in the first record (a residual). The mapped pairs continue to express the time of the streaming. For example, the quantization tuples <v1, 6, 180> and <v1, 7, 4> continue to show, when the durations are combined, a streaming time of 184 seconds. However since the duration values are divided between the quanta values (hours 8 and 9) it is possible to track other aggregated information, such as the overall number of seconds spent streaming in each hour period. This may give, for example, an indication of the resources needed accommodate streaming needs during each hour of the day.

To accomplish such an analysis, the quantization tuples may be aggregated, by a "grouping criterion" such as for example, according to the quanta values. In this example, the four quantization tuples having the quantum of 6 and the four quantization tuples having the quantum of 7 can be aggregated. The quantization tuples above become the following tuples (which may be called "aggregated tuples"):

| |
|---|
| <v1, 6, 263> and |
| <v1, 7, 203> |

For purposes of determining network usage by hour, the set of 4 records above were reduced to two. The quantization method used above is just one of many ways to quantize data. In embodiments of the invention, any known technique to quantize (e.g. mapping continuous-value data to quanta values) can be used. Quantizing values and then aggregating the quantized values (for example locally, at the quantizing node) may reduce the data generated at one node in a processing system and reduce the transfer overhead that occurs in moving data from one node to another in a distributed and/or parallel processing system. Such a mechanism for quantizing and aggregating data can be applied in many different types of data processing systems.

In one example, quantization and aggregation data may be applied in a distributed and/or parallel processing map-reduce system, where "map" nodes and "reduce" nodes are arranged for processing data coming to the system either as bounded data set or as a data stream. In such an example, a map node may be augmented with a quantization mechanism (e.g. a computer process) which may allow the map node to quantize, for example, continuous-value data elements in records and then aggregate the quantized data locally (at the map node) to reduce the number of records before sending the records for further processing to a reduce node.

In a further example, quantization and aggregation of data may be applied in a system for processing stream data, such as a telecommunications system generating streams of call-detail records (CDRs). In such an example, data stream processing and analysis capabilities using quantization and aggregation may be added to (or integrated into) database processing nodes of a network in a telecommunications system. The nodes then may be arranged to perform, for example, a distributed and/or parallel map-reduce process on data (e.g. records) from the data streams, where the map nodes may be configured to perform quantization and aggregation.

Other specific examples are also possible, such as a sensor system application, where nodes of a sensing network, arranged in M-R fashion for example, use quantization and aggregation at each map node for processing vehicle exhaust data measured in city areas.

Many other examples of data processing using quantization and aggregation at nodes in distributed and/or parallel processing systems are also possible.

Example Embodiments

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, for example comprising processors, that manipulate and/or transform data represented as physical, such as electronic, quantities within the computing system's registers and/or memories into other data similarly represented as physical quantities within the computing system's memories, registers or other such information storage, transmission or display devices.

Reference is now made to FIG. 1A, which is a conceptual illustration of a data processing system that may incorporate quantization and aggregation according to embodiments of the invention. FIG. 1A shows data processing system 100 configured to accept input 110, which may comprise data, such as records. Database processing system may be a distributed and/or parallel processing system. In a distributed system, multiple autonomous processing nodes (comprising one or more computer processors) may communicate through a computer network and operate to cooperatively to perform a task. Though a parallel processing computing system can based on a single computer, in a parallel processing system as described herein multiple computer processors operate cooperatively and generally simultaneously to perform a task. There are forms of parallel processing where, multiple processors are geographically near-by and may share resources such as memory. However, processors in those systems also work cooperatively and generally simultaneously on task performance.

Input 110, coming to data processing system 100, may be either bounded data, such as data sets from databases, or stream data. Data processing system 100 may process and analyze incoming records from input 110, using for example structured query language (SQL) queries to collect information and create an output 120.

Within data processing system 100 are two processing nodes 130, 140. The data processing system 100 may include of a plurality of nodes (e.g. hundreds) operating in parallel and/or performing distributed processing. However, in FIG. 1A, two processing nodes 130 and 140 are shown.

Node 130 may include a quantization mechanism 150 to perform quantization and aggregation on the records received from input 110. Quantization mechanism 150 may quantize data in the records processed at node 130 to create quantization tuples (or quanta records) and then aggregate tuples at node 130 (e.g. according to a grouping criterion such as by quanta value) to generate a reduced number of aggregated tuples before sending them for further processing at node 140.

Figure 1B:
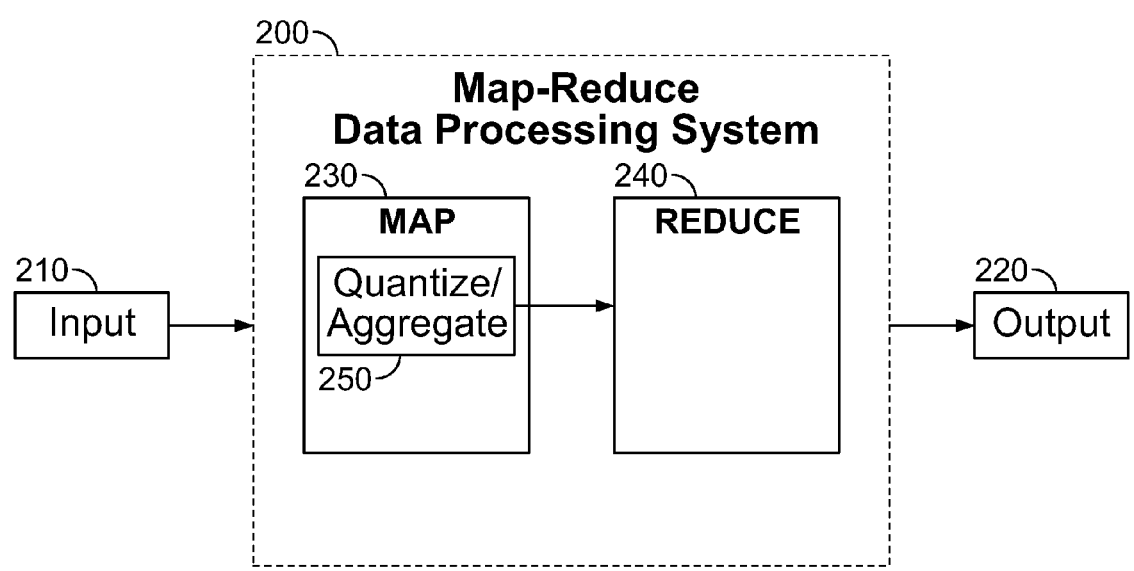
FIG. 1B is a conceptual illustration of a map-reduce data processing system according to embodiments of the invention.

Reference is now made to FIG. 1B, which is a conceptual illustration of a map-reduce (M-R) data processing system that may incorporate quantization and aggregation, according to embodiments of the invention. FIG. 1B shows M-R data processing system 200 configured to accept input 210, which may comprise data (e.g. records). Input 210, coming to M-R data processing system 200, may be bounded data or, alternatively, M-R data processing system 200 may be configured to process stream data. M-R data processing system 200 may process and analyze incoming records from input 210, using for example SQL queries to collect information and create output 220.

Under a map-reduce model in this example (using SQL), a specific M-R process (or application) may be expressed in terms of two queries: a map query and a reduce query. In a different embodiment, such as in a parallel processing system, one M-R query may be specified, where the query has both map and reduce elements (e.g. a map function and reduce function). In the example of a parallel processing system, the map and reduce elements within the single query can be then distributed to network nodes in the form of, for example, query fragments or sub-queries, which serve as the map and reduce queries. In such a system there may be a plurality of map nodes and reduce nodes (e.g. hundreds) operating in parallel (see FIG. 2 below). FIG. 1B, however, shows two processing nodes, map node 230 and reduce node 240, within M-R data processing system 200. In FIG. 1B, the processing nodes may be programmed with a separate map and reduce queries. Map node 230 may execute a map query (containing a map function to perform mapping) and reduce node 240 may execute a reduce query (containing a reduce function to perform data reducing).

Map node 230, in FIG. 1B, may include a quantization mechanism 250, e.g. as part of the map query, to perform quantization and aggregation at the map node. Quantization mechanism 250 may operate to quantize data in records processed at map node 230 (e.g. generating quantization tuples) and then aggregate the quantized data at map node 230 (locally) by a grouping criterion such as grouping by quanta value, to generate a reduced number of tuples (e.g. aggregated tuples). The reduced number of tuples may then be sent for processing to reduce node 240.

Figure 2:
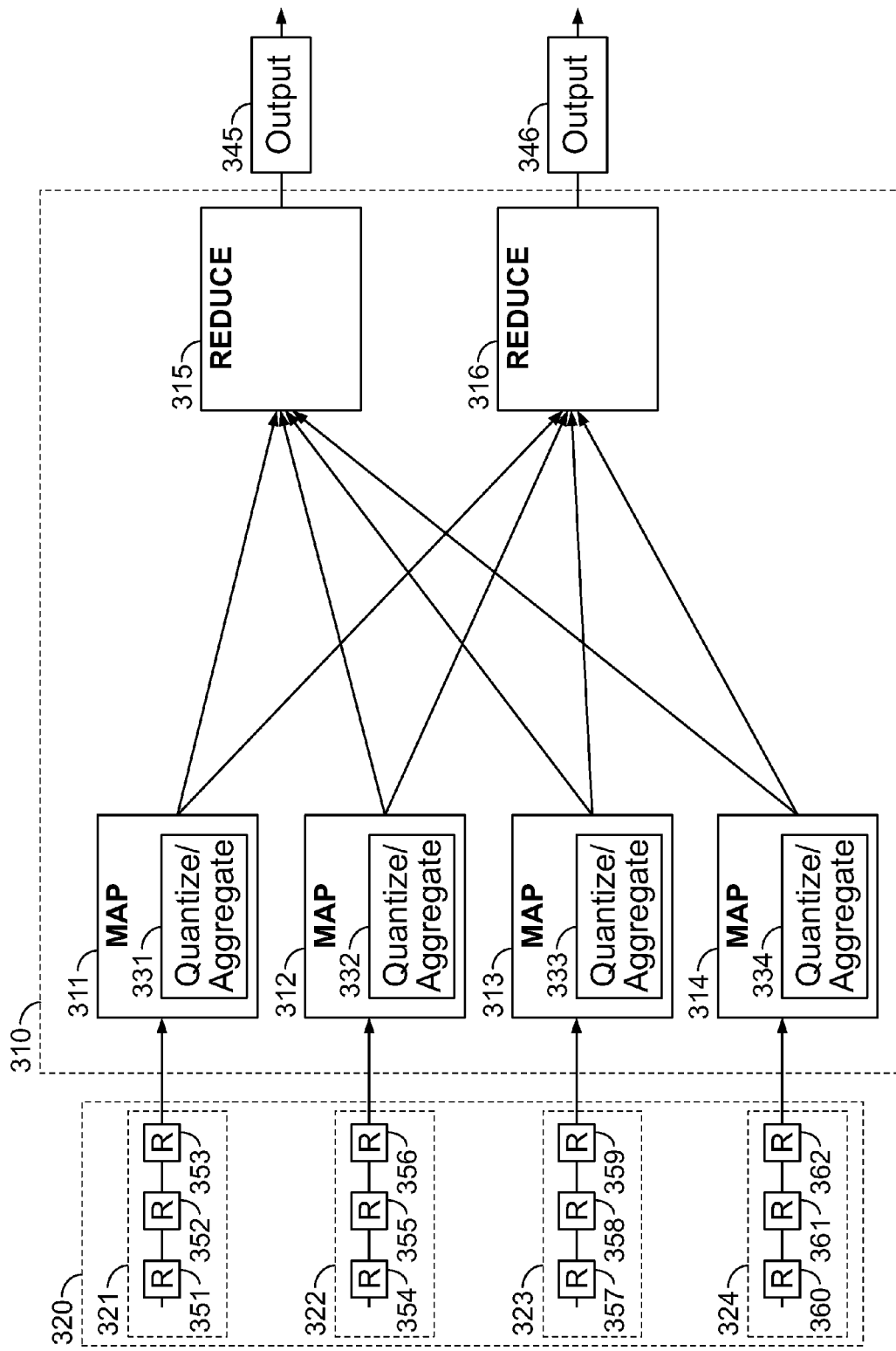
FIG. 2 is a conceptual illustration of another map-reduce data processing system according to embodiments of the invention.

Reference is now made to FIG. 2, which is a conceptual illustration of a map-reduce data processing system incorporating quantization and aggregation in multi-node processes, according to embodiments of the invention. As stated above, a model map-reduce system may operate on or may include a plurality of map nodes and a plurality of reduce nodes operating in parallel. FIG. 2 shows a map-reduce data processing system 310 having map nodes 311, 312, 313, 314 and reduce nodes 315, 316.

Each map node 311-314 receives a portion (or chunk) of the input 320. In FIG. 2 map nodes 311, 312, 313, 314 receive portions 321, 322, 323, 324, respectively. Each portion 321, 322, 323, 324 may include records (351-353 for portion 321, 354-356 for portion 322, 357-359 for portion 323 and 360-362 for portion 323). The portions may be created by partitioning input 320, but other portioning techniques may be used. Partitioning may be the dividing of the records of data stream 130 into distinct portions or groups based a partitioning key. For example a hash function may key data from input 320 equally to each map node 311-314. In one example, input 320 is bounded data and each portion 321-324 represents a bounded data set. In another example input 320 is a data stream and each portion 321, 322, 323, 324 represents a partitioned "chunk" of continuous data.

In FIG. 2, each map node 311-314 is coupled to each of the reduce nodes 315, 316. Working in parallel, each of the map nodes 311-314 executes a map query to map the data to one of the available reduce nodes 315, 316. Reduce nodes 315, 316 execute a reduce query on data received from map nodes 311-314 to create output 345, 346. The map query expresses a map function to perform mapping from an M-R process. The reduce query expresses a reduce function to perform reducing from an M-R process. Each map node 311-314 may have the same map query for processing. Each reduce node may also process using the same reduce query.

Map and reduce queries may be expressed separately. However, a parallel processing environment may permit one query to be written to express both a map and a reduce function and "fragments" or sub-queries of the one query can be distributed to map nodes 311-314 and reduce nodes 315, 316. In such an example, map nodes 311-314 receive fragments or sub-queries containing the map function and reduce nodes 315, 316 receive fragments or sub-queries containing the reduce function. In FIG. 2, one query expresses the M-R process and fragments of that query, which have been distributed to map nodes 311-314 and reduce nodes 315, 316, may serve as the map and reduce queries.

In terms of relational algebra, each map node 311-314 in an exemplary map-reduce (M-R) process may apply a map query to a set of key-value tuples (k, v) created from the data within each received record and may transform the set of key-value tuples into a set of tuples of a different type (k', v'). For example, if data stream 320 contained records such as <address, cat>, <address, dog>, <address, no-pet>, a map function (e.g. in a map query) may map such tuple pairs to different, possibly more useful, tuple pairs for grouping such as: <region1, has-pet> <region1, has-pet.>, <region2, no-pet>.

The different type quantization tuples (k', v') may then have a set of available k' values (e.g. region1, region2, . . . etc.) where each k' may have a corresponding reduce node for gathering tuples having that particular value of k'. FIG. 2 shows only two reduce nodes 315, 316, so in that example there may only be two available values for k'. All the values v' may be re-partitioned by k' at each reduce node 315, 316. For example, records having "region1" k' values may be transferred to reduce node 315, and records having "region2" k' values may be transferred to reduce node 316. Reduce nodes 315, 316 may aggregate the set of values v' with the same k'. The three tuples above can be aggregated to:

<region1, has_pet, 2>
<region2, no_pet, 1>

The set of relationships for map-reduce may be expressed as follows:
Map query: (k, v)=>(k', v')*
Reduce query: (k', v')*=>(k', v'*)
where (k, v) may be mapped to multiple (k', v') values (as indicated by the asterix*) and (k', v')*=>(k', v'*) shows aggregation of the set of values v' having the same k' (to create v'*).

In FIG. 2 each map node 311-314 may include a quantization mechanism 331-334, respectively, and may execute the quantization mechanism as part of the map query to perform quantization and aggregation. Quantization mechanisms 331-334 each may operate to quantize data in records processed at each map node 311-314 (e.g. to generate quantization tuples) and then aggregate the quantized data locally at each map node 311-314 (e.g. producing aggregated tuples) to reduce the data being sent to reduce nodes 315, 316 in a M-R process.

Example Telecommunications Data Processing System

As described above, database processing using a quantization mechanism may be implemented in many different processing systems. In one embodiment, a quantization mechanism may be used to provide distributed (and/or parallel) database processing within a telecommunications system. In such an example, a system is provided to process streams of call-detail records (CDRs) generated by a telecommunications system.

Figure 3:
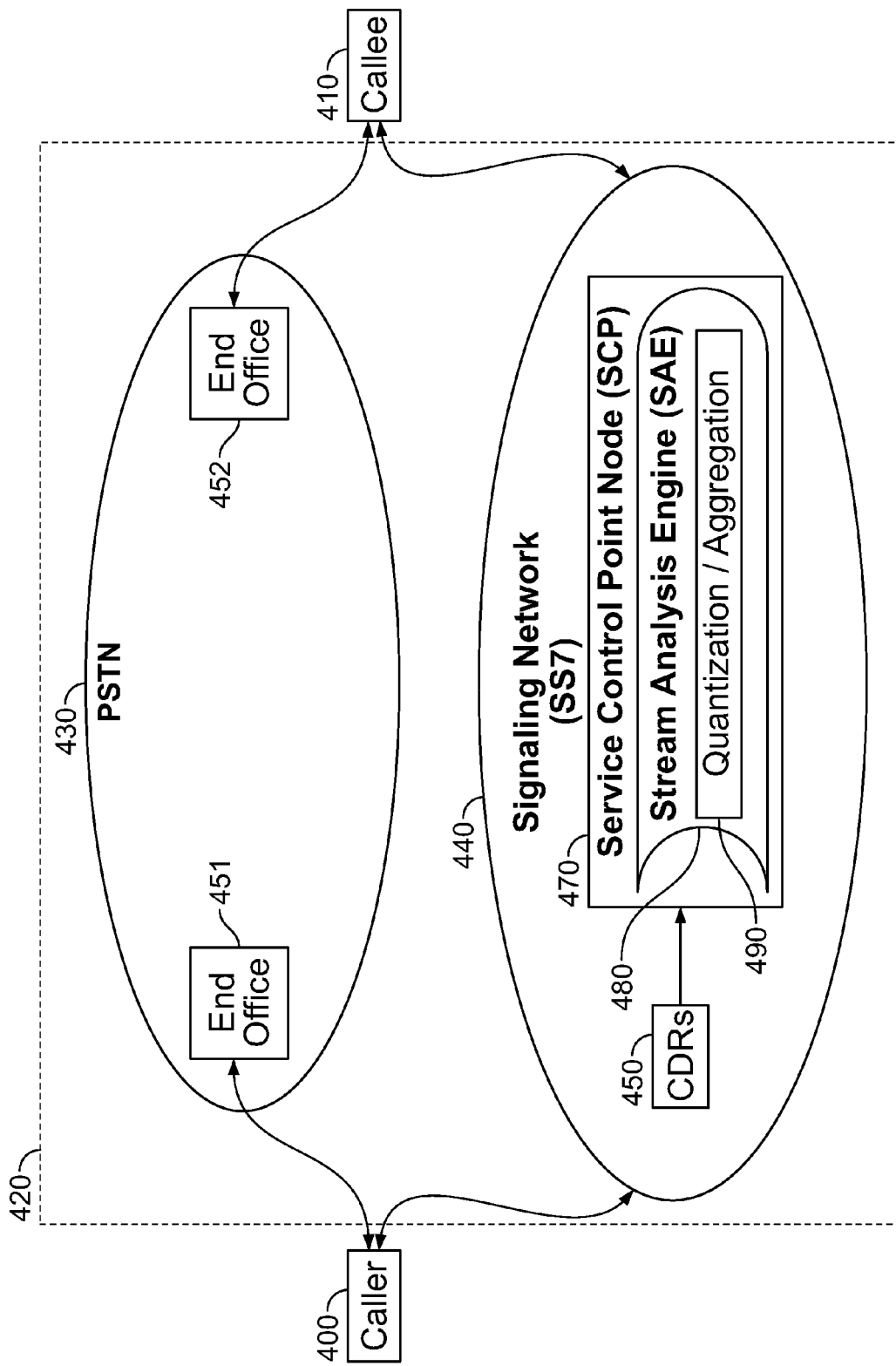
FIG. 3 is a conceptual illustration of a telecommunications system that incorporates a data stream processing system, according to embodiments of the invention.

Reference is now made to FIG. 3, which is a conceptual illustration of a telecommunications system that incorporates a stream data processing system with quantization and aggregation, according to embodiments of the invention. FIG. 3 shows caller 400 who may be speaking to callee 410 using telecommunications system 420. Caller 400 and callee 410 may be connected to telecommunications system 420 using wireless or wired (landline) connections.

Telecommunications system 420 may further include Public Switched Telephone Network (PSTN) 430, for carrying the voice and data communications between caller 400 and callee 410, and signaling network 440, for performing signaling to set up and manage telephone calls. In telecommunications system 420, the signaling performed to set up and manage telephone calls may be separate from the telecommunications circuits that actually carry the telephone conversations.

Signaling network 440 may be a packet-switched signaling network that uses Common Channel Signaling System No. 7 (SS7) protocols for communications transmissions. SS7 protocols may be used to transmit signaling information to set up calls in PSTN 430. The functions of signaling network 440 may include call management, database query, routing, flow and congestion control and other features.

Caller 400 and callee 410 may connect to PSTN 430 through network switches, which may be called "End Offices" 451, 452. End Offices ("EO") 451, 452 and other switches within PSTN 430 (such as switches known as "tandems" (not shown)) allow caller 400 and callee 410 to communicate through the PSTN 430. Calls over the PSTN 430 (set up by signaling network 440) may generate call-detail records (CDRs) 450. Some networks may generate massive amounts of CDRs. Network traffic surveillance may be based on monitoring and analyzing the traffic volume over time between pairs of switches (e.g. EOs or Tandems). CDRs 450 may be collected (or captured) by nodes within signaling network 440, such as Service Control Point (SCP) node 470.

In some embodiments, SCP 470 may include a "stream analysis engine" (SAE) 480. An SAE may be a database engine that includes extensions to perform data stream processing. SAE 480 may be configured to process portions or "chunks" of CDRs. SAE 480 may include quantization mechanism 490, which may be a process or function to perform quantization. Quantization mechanism 490 may operate to quantize data in CDR records 450 received at SCP 470 and then aggregate the quantized CDR 450 (locally) to reduce data output before sending the output for further processing.

Figure 4:
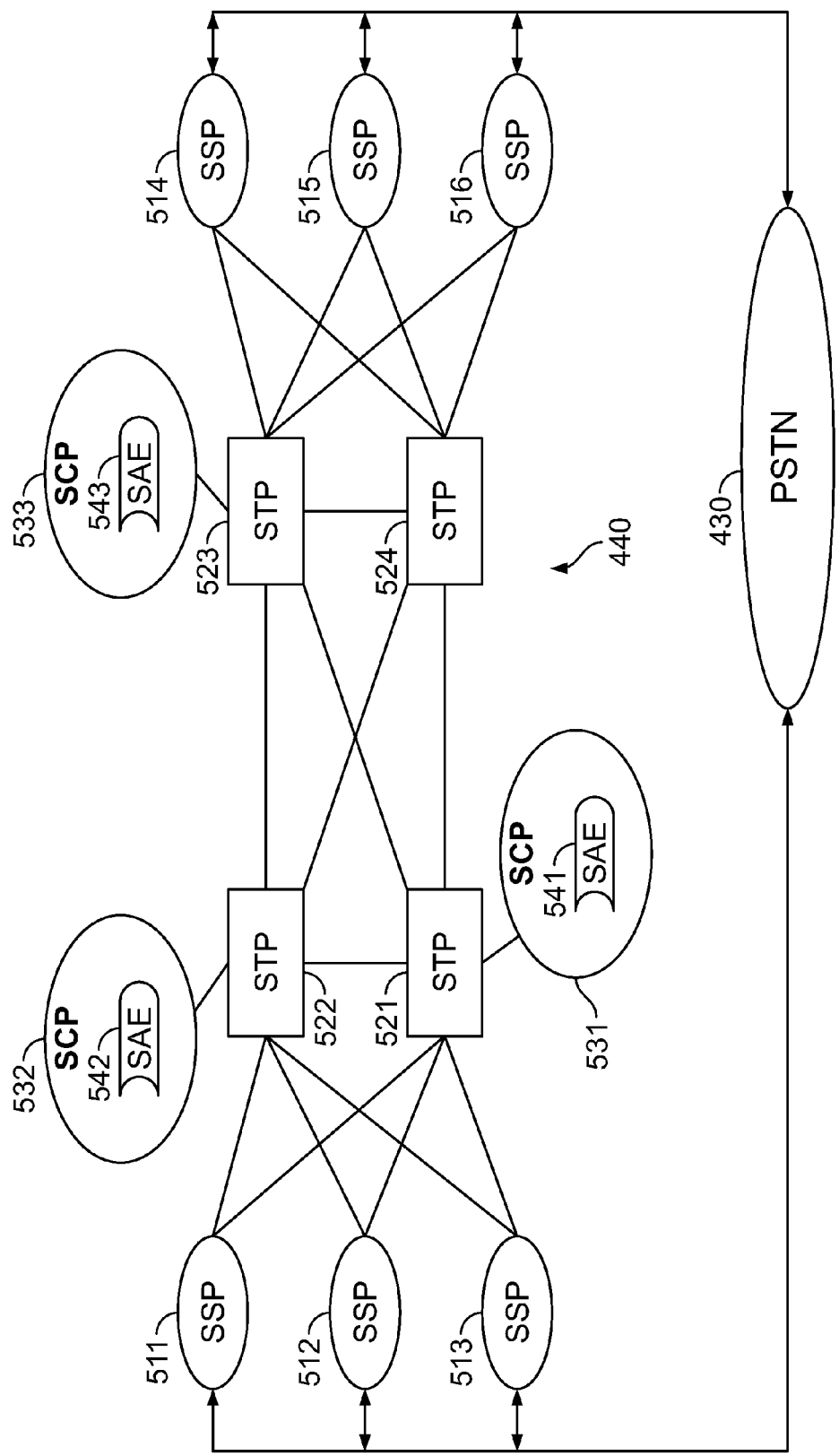
FIG. 4 is a conceptual illustration showing the nodes of a signaling network according to embodiments of the invention.

Reference is now made to FIG. 4, which is a conceptual illustration showing the nodes of signaling network 440 in greater detail, including SCP nodes. Several types of nodes may exist in signaling network 440.

As seen in FIG. 4, a plurality of service switch point (SSP) nodes 511, 512, 513, . . . , 516 may be connected to, may be a part of, or may communicate with voice switches, such as End Offices within a PSTN (connections to PSTN 430 are shown in FIG. 4). In different embodiments, each SSP node 511-516 may be either part of a PSTN voice switch or may be executed on separate computers connected to particular voice switches. In one example, SSP node 511 may have voice switch functionality and may process voice-band traffic (e.g., voice, fax and/or modem) and, in addition, may perform SS7 signaling. In another example, SSP node 512 may operate separately from a voice switch and may perform only SS7 signaling. Each SSP node 511-516 may communicate according to SS7 protocols and may create signal units for communication over signaling network 440. For example, SSP node 514 may convert signaling from a voice switch (e.g. an EO) of PSTN 520 into SS7 format and transfer the signals to one of the other nodes in signaling network 440.

A plurality of signal transfer point (STP) nodes 521, 522, 523, 524 may also be included in signaling network 440. Each STP node 521-524 may allow SS7 messages to travel from one SSP node, e.g. 511, to another SSP node, e.g. 516. STP nodes 521-524 may use packets to exchange information related to call connections or telephone system database information requests.

Signaling network 440 may also include a plurality of SCP nodes 531, 532, 533 (like service control point node (SCP) 470, shown in FIG. 3). Each SCP node 531-533 may be configured to access a telephone company database that may store information about subscriber's services, routing of special service numbers, calling card validation, fraud protection and other network features.

In some embodiments, SCP nodes 531-533 may be further configured to provide data-intensive service for a business intelligence (BI) application, such as CDR data stream analysis. In such an embodiment, SCP nodes 531-533 may each include, or alternatively be associated with, a stream analysis engine (SAE), such as for example SAEs 541, 542, 543 for processing CDR records. SAEs 541, 542, 543 may be database engines configured with extensions for processing stream data. One or more of the SAEs 541, 542, 543 may be further configured to execute a quantization and aggregation procedure, for example to reduce data overhead as CDR records are processed.

Stream processing may be performed, for example in distributed (and/or parallel) fashion, on the call-detail records (CDRs) of a telecommunications system received (e.g. captured) by the SCP nodes in signaling network 440. CDRs may be generated within telecommunications system 420 to represent the information specific to each call attempt. Each CDR may contain, among other things, the calling phone number, the called phone number, the start and end time of the call, as well as a "point code" of the "originating end office", referred to as the originating point code (OPC), and the "destination end office", referred to as the destination point code (DPC).

Correspondence may be found between point codes and phone number information in CDRs. Point codes such as OPCs and DPCs can be mapped to the phone numbers found in CDRs. In a CDR, a phone number may be recorded in three fields: NPA (Area Code), NXX (Exchange) and LINE. For example, a ten-digit US phone number, 1-650-852-6000, has NPA (Area Code)=650, NXX (Exchange)=852 and LINE=6000. Although the Area Code/Exchange codes in a phone number might be seen to correspond to originating or destination end office, e.g. 451, 452 (FIG. 3), those numbers may not necessarily correspond to OPC and DPC point codes. However it is possible to map (for example using a table) NPA-NXX numbers to the OPC and DPC point codes. Thus, the information in a CDR may be useful for determining information such as origination and destination end office usage.

A BI application for network traffic surveillance may be based on monitoring and analyzing the traffic volume over time between pairs of switches, e.g., EOs and other switches such as "tandems", mentioned above. Surveillance may be performed, for example by collecting and processing CDRs. The traffic volume may be measured, for example, by centum call seconds (CCS) calculateable from time stamps found in a CDR, which may represent a traffic volume unit of measurement equivalent to 100 call-seconds.

Based on CCS data, further information may be derived such as moving average and traffic balance (the ratio of two-way traffic between a pair of EOs). With the end-point traffic summary (e.g. reporting on traffic between end offices) and other attributes, such as call type, various analysis measures can be derived, the distribution of traffic load, the skew of traffic typically caused by some form of data traffic (e.g., Internet Service Provider (ISP) traffic), number of call attempts, etc. for each hour of a day. The analysis results can be used to enhance network configuration, avoid traffic-jams, discover customer call patterns and improve quality of service (QoS).

In one embodiment, SCP nodes 531-533 (FIG. 4) may be used as sites for integrating distributed dynamic data analytics of the CDR records with the management of metadata, rules, models and other prepared data, as well as for creating and retaining continuous analysis results. In such an example, multiple SAEs 541-543 (FIG. 4) may be provided to process (in a distributed and/or parallel application) portions of CDR data streams generated within a telecommunications system (e.g. 420) and received (or captured) by SCP nodes 531-533. In such an embodiment, SCP nodes 531-533 may be used to create a distributed (and/or parallel) infrastructure for CDR stream processing. Distributed and/or parallel stream processing of CDR data may then be integrated into the database engine processing of SCP nodes 531-533. The model for distributed (and/or parallel) processing of CDRs may allow a map-reduce (M-R) process to be implemented within nodes of the telecommunications system.

In such an example, data intensive CDR analysis and processing may, in effect, be "pushed down" to the database engines of SCP nodes 531-533 and may provide fast data access and reduced data movement. Such an implementation may represent a relaxation of the "store-first, analyze-later" legacy of data warehousing and may allow stream analytics (e.g. a data stream processing application) for telecommunications BI to be executed with low latency.

Figure 5:
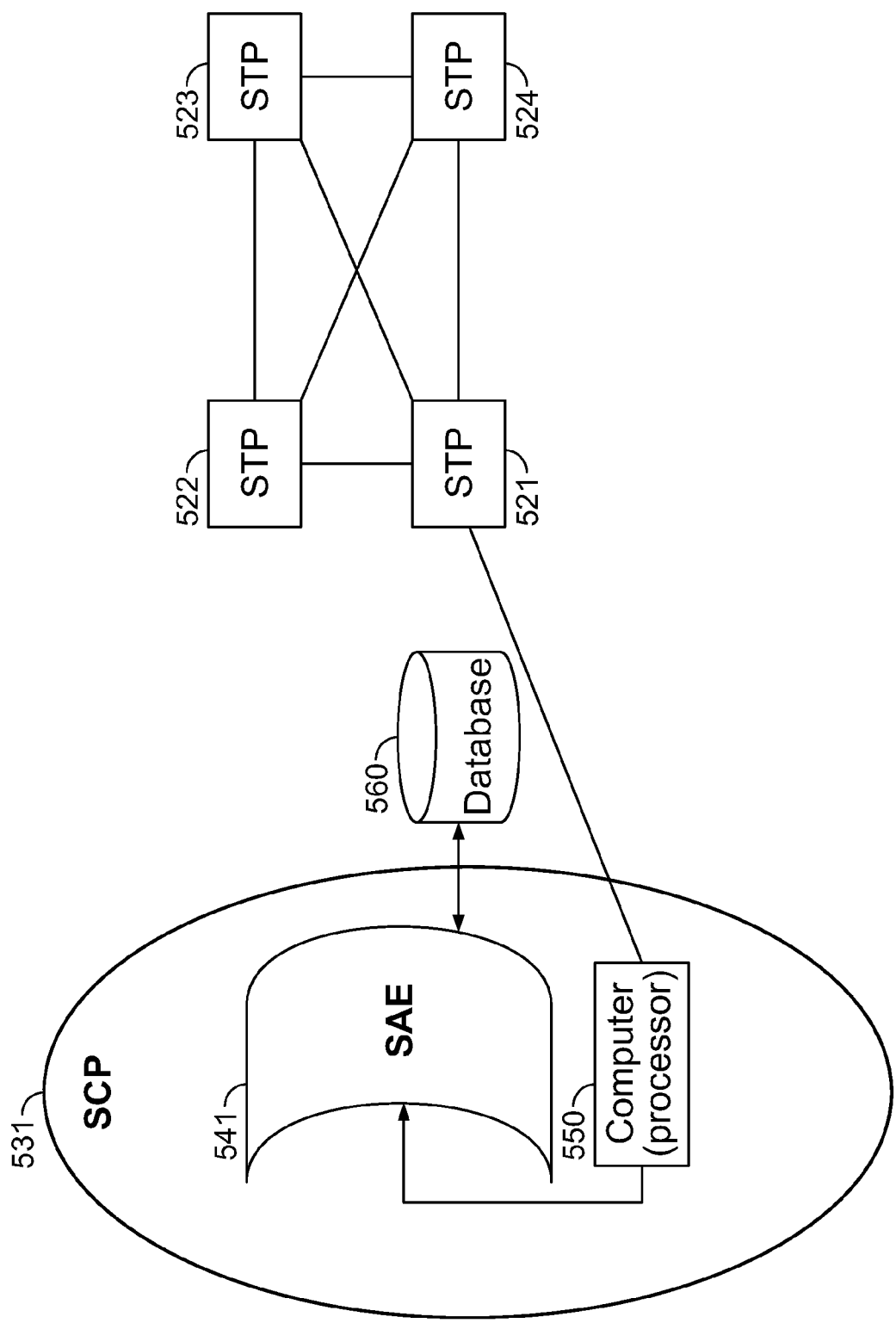
FIG. 5 is a conceptual illustration of a service control point node that may include a quantization mechanism according to embodiments of the invention.

Reference is now made to FIG. 5, which is a conceptual illustration of SCP node 531 according to embodiments of the invention, showing its elements in further detail. Each SCP node 531-533 in signaling network 440 (FIG. 4) may be similarly configured. FIG. 5 shows SCP node 531 and its connection to signaling network 440 through STPs 521-524.

SCP node 531 may include a computer 550 having a processor. Computer 550 may be used to interface and access a database 560, such as a telephone company's database (mentioned above) that provides subscriber and other telephone service information. In a general case, not concerning stream processing, computer 550 may access database 560 using an associated database engine. A database engine may include software elements used to perform database access and maintenance functions such as creating, reading, updating and/or deleting data from a database. SCP node 531 may receive, for example an SS7 signaling message that may request a query be made to database for subscriber service and routing information. Computer 550 may access database 560 using the associated database engine to make the query. In FIG. 5, SAE 541 is a database engine that is configured to perform as generally needed by SCP node 531. However, in this example, SAE 541 may also be a database engine that has been extended to perform data stream processing.

With SAE 541 (a database engine extended for stream processing) SCP node 531 may be further provide processing and analysis of CDRs, for example as part of a BI application. In one embodiment SAE 541 may be a database engine extended so it can work as either a "map engine" or a "reduce engine" for performing an M-R process on a data stream. As shown in FIG. 5, one SAE 541 may be incorporated into SCP node 531. However, it is possible that more than one SAE can also be incorporated into SCP node 531.

In the example of FIG. 5, SCP node 531 can comprise any computer or processor having network communication capabilities and database access interface (and in this example) the interface to access SAE 541. As one non-limiting example, a computer having a processor such as an HP xw8600 computer with 2× Intel Xeon E54102 2.33 GHz CPUs and 4 GB RAM, running a database engine extended for processing as described in embodiments of the invention may be suitable for processing large amounts of records. However, the invention is not limited to such a configuration and many other processors and/or computers are suitable.

The type of computer used may depend upon the number of records to be processed and the time required for processing. For example, for processing massive amounts of data in a shorter time frame, a parallel-processing computer system such as an HP Neoview may be used as the computer 550. However other computers, even a PC could be used for implementing the invention, depending upon the requirements of the data processing tasks.

SAE 541 may be an extendable database engine with query execution capabilities such as the database engines used with the Oracle, Microsoft SQL, IBM DB2, Sybase, MySQL, Postgre SQL Teradata, Infomix or Ingres server systems. SAE 541 may comprise software, such as in the form of code configured to work with an extensible data base engine, such as server systems mentioned above, and therefore it would be configured to perform in the execution of queries in a structured query language (SQL). In one embodiment, an SAE (such as SAE 541) may be integrated into a database engine such as a PostgreSQL engine.

Figure 6:
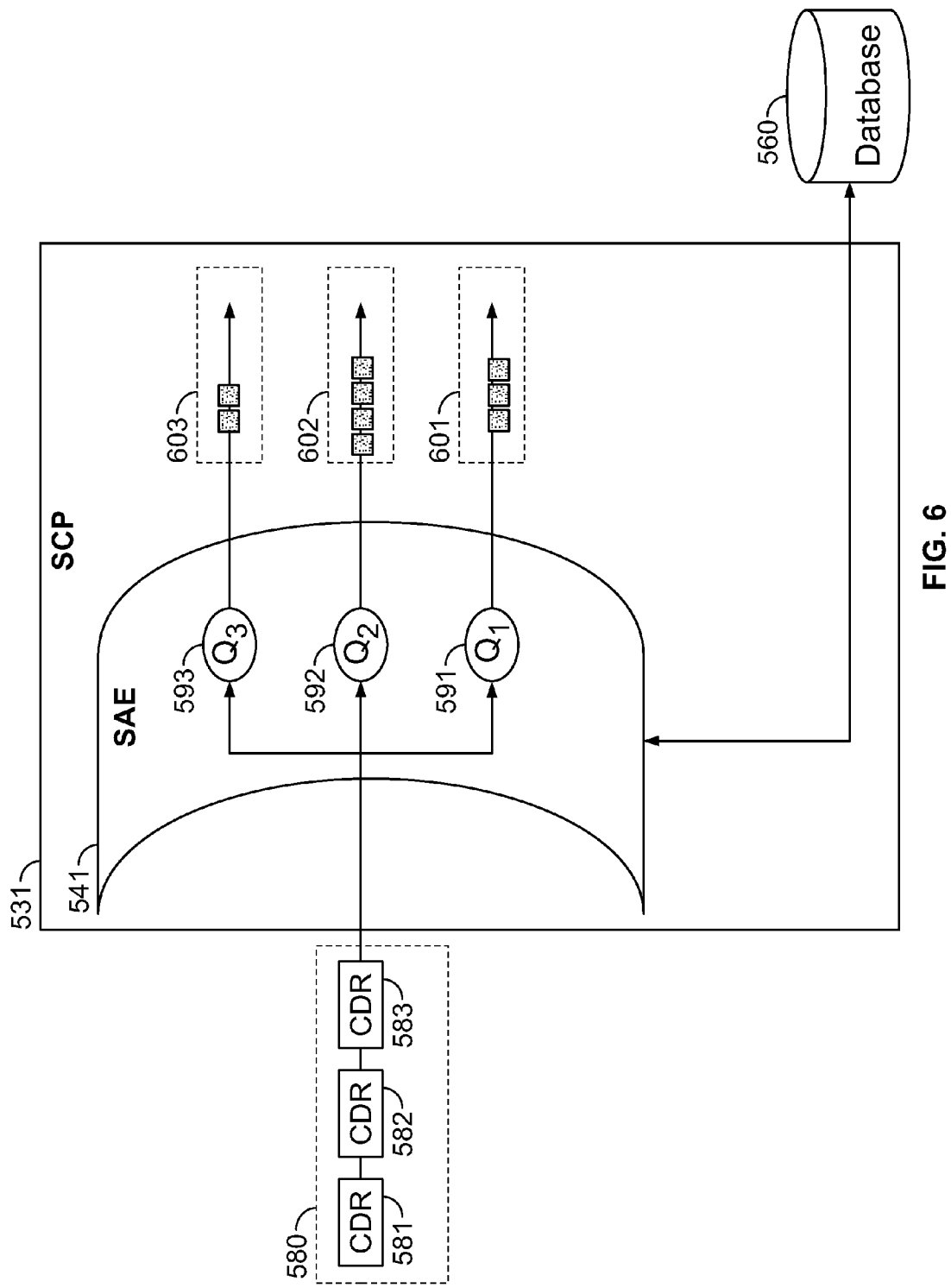
FIG. 6 is a conceptual illustration showing a stream analysis engine for data stream processing, according to embodiments of the invention.

Reference now is made to FIG. 6, which is a conceptual illustration showing exemplary processing of an SAE in an SCP node (SAE 541 at SCP node 531). In operation, the SAE 541 may receive a portion 580 of a CDR stream, e.g., a partition, as input. Portion 580 may contain CDRs 581, 582, 583. Portion 580 may have been created from a partitioning that was performed on the CDR stream, such as by hash-partitioning (where a hash function breaks the stream into portions according to the number of available nodes for processing the data). The SAE 541 may execute a stream analysis process by running a query 591, such as continuous query (CQ) on CDRs 581-583. A continuous query is a type of query that may be run continuously (without shutdown or termination) on different sets of data, such as on different portions of data coming to SAE 541. A continuous query may be useful for processing streams of data, because it may enable one query to be used for processing a long data stream. In other embodiments, other queries, such as a set of non-continuous queries processing iteratively, may be used.

SAE 541 may execute query 591 (in this case a CQ). In one embodiment, it is possible for SAE 541 to run more than one query (e.g. multiple CQs) 591, 592, 593 on portion 580. In such an example, SAE 541 may be configured to run multiple stream analysis processes on portion 580 in terms of queries 591, 592, 593 (e.g. multiple CQs). Output 601, 602, 603 may be extracted and mapped tuples from the processing of a map function.

In executing the queries 591, 592, 593, SAE 541 may also execute a quantization and aggregation procedure for each which may reduce the amount of output 601, 602, 603 transferred to a subsequent processing stage. SAE 541 may quantize data in CDRs received to create quantization tuples (or quanta records). The quantizing may map continuous-value data found in each CDR to a set of discrete quanta values to create the tuples. SAE 541 may then aggregate the generated quantization tuples at SCP 531 by a grouping criterion, such as grouping by similar quanta value, to create a reduced set of aggregated tuples. The aggregated tuples (representing a smaller data set) may then be sent for further processing.

Example Map-Reduce Process for CDR Processing

In one embodiment for processing CDR data streams, the distribution of SCP nodes in a signaling network (e.g. SCP nodes 531-533 in signaling network 440, FIG. 4) may be logically organized in map-reduce (M-R) fashion in a distributed (and/or parallel) processing environment to perform M-R. In such an embodiment, SCP nodes may be logically organized into two groups: map nodes and reduce nodes.

Figure 7:
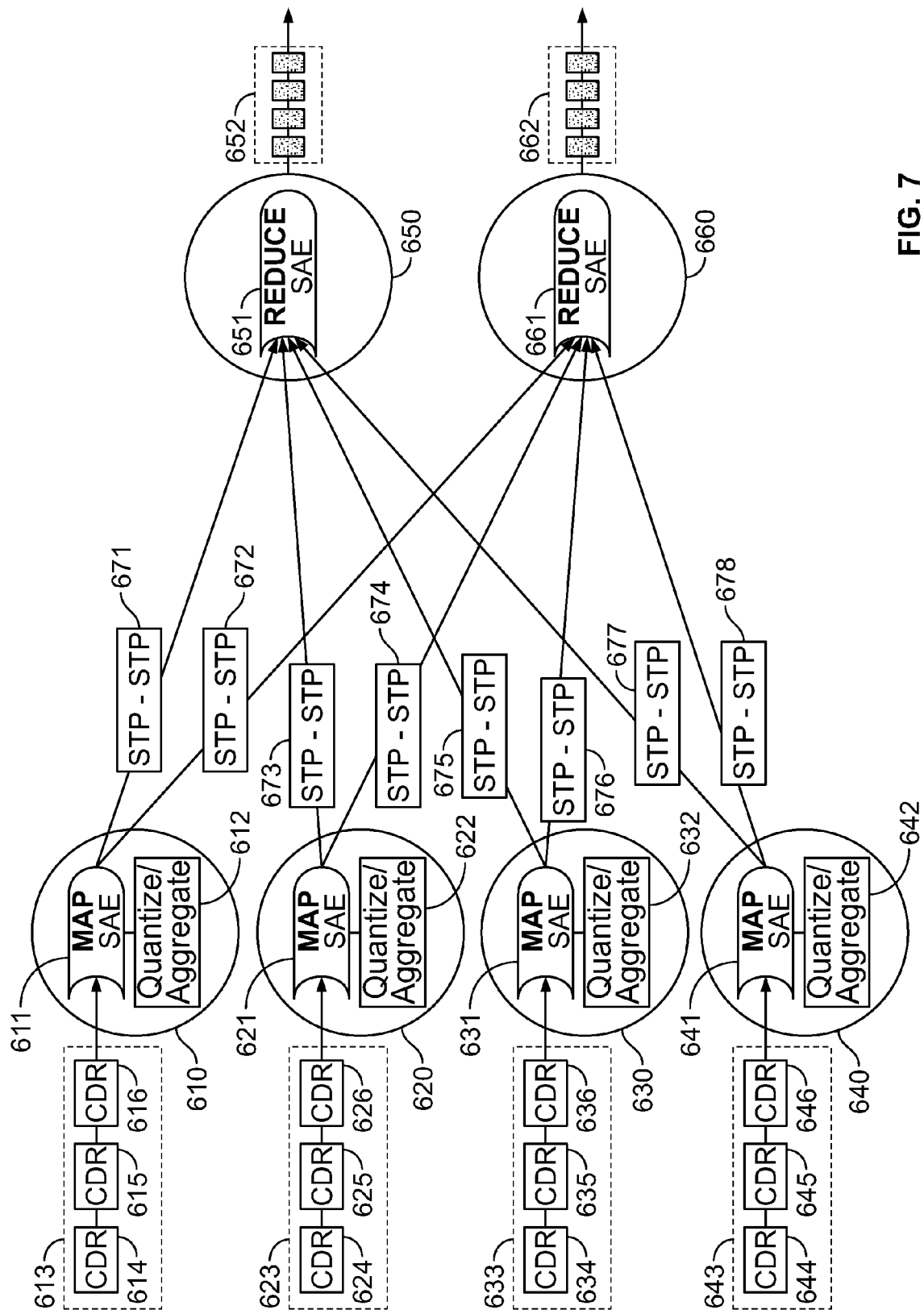
FIG. 7 is a conceptual illustration of a map-reduce arrangement for data stream processing in service control point nodes in a signaling network, according to embodiments of the invention.

Reference is now made to FIG. 7, which is a conceptual illustration of a distributed (and parallel) map-reduce (M-R) arrangement for SCP nodes in signaling network 440. FIG. 7 shows SCP nodes 610, 620, 630, 640, which may be map nodes, and shows SCP nodes 650, 660, which may be reduce nodes.

As stated above, a distributed map-reduce process following the M-R model may be expressed in terms of two queries: a map query and a reduce query. In parallel, cluster-based processing systems (where are the computers are geographically together and may share memory and other resources) the two queries may be combined or expressed in one query. However, in an embodiment where SCP nodes 610, 620, 630, 640 are distributed (like here, throughout a signaling network) and not part of a cluster-based parallel processing system, two separate queries, instead of one combined query, may be used. In such an exemplary configuration, the nodes will process in parallel In the example of FIG. 7 two queries, for example two continuous queries (CQ), may be provided: $CQ_{map}$ and $CQ_{reduce}$. SCP nodes 610, 620, 630, 640, configured as "map" nodes, may be arranged to execute a $CQ_{map}$ using their associated SAEs 611, 621, 631, 641, respectively. SAEs 611, 621, 631, 641 may be considered "map" SAEs.

For "reduce" nodes, the arrangement may be similar. In the example of FIG. 7, SCP nodes 650, 660, configured as reduce nodes may be arranged to execute a $CQ_{reduce}$, using their associated SAEs 651, 661, respectively. SAEs 651, 661 may be considered "reduce" SAEs.

The separation of map SAEs 411-414 and reduce SAEs 415-416 may be a logical and not a physical distinction, since one SAE may act as a map engine, a reduce engine, or both. It is possible that one or more of SCP nodes 610, 620, 630, 640, 650, 660 could serve as both a map node and a reduce node.

Each map SAE 611, 621, 631, 641 may be operated by its associated computer (processor) to run the $CQ_{map}$. Likewise, each reduce SAE 651, 661 may be operated by its associated computer (processor) to run the $CQ_{reduce}$. (See, e.g., computer 550 and SAE 541 in FIG. 5.) The same $CQ_{map}$ may be run by map SAEs, 611, 621, 631, 641 in distributed fashion for a given M-R process. The same $CQ_{reduce}$ may run at all participating reduce SAEs 651, 661 in distributed fashion also.

In operation, SCP nodes 610, 620, 630, 640, configured as map nodes, may each receive (e.g. capture) a continuous stream of CDRs to process 613, 623, 633, 643, respectively. SCP nodes 610, 620, 630, 640 may feed the records for processing to SAEs, 611, 621, 631, 641, respectively.

As the CDR streams are processed at each SCP nodes 610, 620, 630, 640 they are processed in portions or "chunks". The portioning or "chunking" at each node may be based on a factor, such as by a time value. For example, each CDR contains time values which may be used for "chunking" or partitioning.

When a telephone call is made on PSTN 430 (see FIG. 3) a CDR may be created (for example by a CDR generator within the telecommunications system) when the telephone call starts, and the CDR may be closed (completed) when the call ends. Time stamps, which may be found in the CDR records, may be used for processing the CDR stream at SCP nodes 610, 620, 630, 640. SCP nodes 610, 620, 630, 640 may be configured to partition incoming CDRs into portions of "chunks" by time intervals. For example, a chunk might contain all CDRs created (new calls placed in), or completed (call details recorded) within a ten-minute time period. Other possible partitioning techniques are possible, such as by partitioning based on cardinality (e.g. every 1000 CDRs).

Map SAEs 611, 621, 631, 641 may also execute a $CQ_{map}$ on a repeating, cyclical basis, following a "query cycle". Where the query cycle pertains to a continuous query, such as $CQ_{map}$, the model may provide for a single query, $CQ_{map}$, to be executed again and again, cycle-by-cycle (without terminating the query) on new portions or "chunks" of data arriving for processing by SAEs 611, 621, 631, 641. By running the same query on different portions or "chunks" without terminating the query, it may be possible to obtain a stream of portion-by-portion or "chunk by chunk" results corresponding to the input, with additional data collected such as a moving average data.

Additionally, operations map SAEs 611, 621, 631, 641 may be synchronized, so SAEs 611, 621, 631, 641 each execute the same $CQ_{map}$ at the same time on similarly partitioned data. For example, map SAEs 611, 621, 631, 641 may have their query cycles synchronized so each may execute $CQ_{map}$ where the window boundary matches the data partitions. Where CDRs are partitioned in ten minute intervals, the "query cycle" for each map SAE 611, 621, 631, 641 may also be set to process all of the CDRs having time stamps that match the ten minute time window. In such an example, map SAEs 611, 621, 631, 641, executing their respective $CQ_{map}$, may process the CDR stream data portion-by-portion, or "chunk-by-chunk," based on the common query cycle window boundary. Such an arrangement map may allow map SAEs 611, 621, 631, 641, to cooperate in processing without centralized scheduling.

In FIG. 7, portions or "chunks" 613, 623, 633, 643 of a CDR data stream may be fed into map SAEs 611, 621, 631, 641, respectively. Each portion 613, 623, 633, 643 may include a number of CDRs, such as CDRs 614, 615, 616 (for portion 613), CDRs 624, 625, 626 (for portion 623), CDRs 634, 635, 636 (for portion 633) and CDRs 644, 645, 646 (for portion 643). Map SAEs 611, 621, 631, 641 each may execute the $CQ_{map}$ on the CDRs in portions 613, 623, 633, 643, respectively (following a query cycle that is synchronized or otherwise). Outputs from map SAEs 611, 621, 631, 641 may be sent to each of reduce SAEs 651, 661. Reduce SAEs 651, 661 may be configured to perform the $CQ_{reduce}$ on a synchronized or non-synchronized basis.

Though the input size of a portion or "chunk" of such a CDR stream might be huge (for example by collecting CDRs over a ten-minute time interval), but, after the "reduce" phase of an M-R process is applied, the size of the resulting data can be much smaller. Such results 652, 662 may be persisted (the query results saved) and, possibly, incrementally updated with the processing results of additional, subsequent portions or "chunks".

In one embodiment, reduce SAEs 651, 661 may execute the $CQ_{reduce}$ based, for example, on an aggregate-grouping criterion, which shuffles map results to the appropriate reduce nodes for aggregation. As one example, the aggregate-grouping criterion may be specified in hash-tables replicated at map nodes 610, 620, 630, 640 (network-replicated hash tables). For example, every map node 610, 620, 630, 640 may get the same hash table with a hash function to route (by hash-partition) the map results to the appropriate reduce nodes (e.g. in FIG. 7 either 650 or 660).

Data transport from map SAEs 611, 621, 631, 641 to reduce SAEs 651, 661 may be made using the SS7 protocols via STP-STP transports (671-678). However, between map nodes and reduce nodes, the transfer of data may be voluminous and require substantial time to transfer.

Example Quantization Mechanism

Therefore, in some embodiments map SAEs 611, 621, 631, 641 may also additionally execute when running $CQ_{map}$ a quantize and aggregation procedure 612, 622, 632, 642, respectively, to reduce the data output from each map node. Since the amount of data generated by each map node may be substantial, quantization and aggregation procedure 612, 622, 632, 642 may significantly reduce data transfer overhead in moving data from map nodes (610, 620, 630, 640) to reduce nodes (650, 660).

In FIG. 7, quantization mechanisms 612, 622, 632, 642 may be executed as part of map SAE 611, 621, 631, 641 processing. Quantization mechanisms 612, 622, 632, 642 may be incorporated for example into functions which make up the $CQ_{map}$. In other embodiments, the quantization mechanism may be maintained and executed separately from $CQ_{map}$. A "mechanism" may be any computer-based process or function, in hardware or software, that may perform quantization on a database record and can include query processes executed either alone, in conjunction with, or as part of a database query (such as a $CQ_{map}$).

Looking further into an example of quantization for CDR processing, $CQ_{map}$, run by map SAE 611, 621, 631, 641, may operate to transform, filter and locally aggregate a CDR with a (partial) tuple arrangement such as:

<$NPA_0$, $NXX_0$, $LINE_0$, $NPA_d$, $NXX_d$, $LINE_d$, $t_s$, $t_e$>
where $NPA_0$, $NXX_0$, $LINE_0$ denote the caller's phone number, $NPA_d$, $NXX_d$, $LINE_d$ denote the callee's phone number, $t_s$ denotes the start time of the call and $t_e$ denotes the end time of the call. In this example, an example portion or "chunk" of CDRs may have tuples such as:

<$NPA_0$, $NXX_0$, $LINE_{o1}$, $NPA_d$, $NXX_d$, $LINE_{d1}$, $t_1$, $t_2$>
<$NPA_0$, $NXX_0$, $LINE_{o2}$, $NPA_d$, $NXX_d$, $LINE_{d2}$, $t_3$, $t_4$>

In this example, it may be assumed that the time period <$t_1$, $t_2$> may cover an hour k (having the full 36 CCS units) and part of hour k+i (having 2 CCS units). In this example it may be further assumed that <$t_3$, $t_4$> may cover a part of hour k (with 3 CCS units) and a part of hour k+i (with 4 CCS units). A map query executed by a map SAE, e.g. 411, in such an example, may first map the two CDR tuples one-to-one to derive two other tuples, such as the following, where call origin and destination numbers may be converted to OPC and DPC of the origination and destination EOs:

< $opc_1$, $dpc_2$, $t_1$, $t_2$>
< $opc_1$, $dpc_2$, $t_3$, $t_4$>

In general, the amount of data moved from a "map" site (SCP nodes 610, 620, 630, 640) to a "reduce" site (SCP nodes 650, 660) may have a significant impact on overall processing performance. Thus, pre-aggregating data generated at the map site (610, 620, 630, 640) before the data is sent to a reduce site (650, 660) may reduce data movement between map and reduce sites and may improve processing efficiency.

In general, where there is longer time or computer resource cost to transport data from one node to the next in a distributed (and/or parallel) processing computer system, there may be more saving (in terms of time or computing resources) using quantization and aggregation, according to embodiments of the invention. The savings may be substantial In a large-scale implementation, such as in implementing a map-reduce process using distributed SCP nodes in a signaling network of a telecommunications system.

In the example above, some data reduction may be made by summarizing the centum call seconds (CCS) time values as grouped by the origin EO, the destination EO and the time period of the call. Aggregation of tuples on such given attributes may permit data grouping based on the common values of these attributes. In the example above, phone numbers have been abstracted or mapped to the point codes of the EOs. To further aggregate by "call period" (e.g. aggregating by the ($t_s$, $t_e$) values) may provide very little additional benefit. For example, there may be only a few common values for ($t_s$, $t_e$), because the time stamp values are measured in millisecond units.

As a result, the data volume locally reduced by the abstraction technique of mapping may be limited. Without a further technique, large amounts of data may be possibly again forwarded to a reduce site (650, 660) from a map site (610, 620, 630, 640). Following this example, map SAE 611, configured to perform quantization, may map the two CDR tuples above to the following derived quantization tuples (quanta records):

| |
|---|
| <$opc_1$, $dpc_2$, k, 36> |
| <$opc_1$, $dpc_2$, k+1, 3> |
| <$opc_1$, $dpc_2$, k, 2> |
| <$opc_1$, $dpc_2$, k+1, 4> |

Map SAE 611, executing the query, may then aggregate the four tuples, grouping them according to a grouping criterion, for example, by origin EO (OPC), destination EO (DPC), and hour to yield the following aggregated tuples (aggregated records):

| |
|---|
| < $opc_1$, $dpc_2$, k, 38> |
| < $opc_1$, $dpc_2$, k+1, 7> |

In this example four tuples have been reduced to two, which may provide resource savings in transferring these records to reduce nods. As $CQ_{map}$ may be repeatedly run, cycle-by-cycle execution of $CQ_{map}$ may generate a sequence of "chunk"-based results. Assume here that two "chunks" have now been processed with results as follows:

| |
|---|
| Chunk 1: |
| < $opc_1$, $dpc_2$, k, 78> |
| < $opc_1$, $dpc_2$, k+1, 34> |
| Chunk 2: |
| < $opc_1$, $dpc_2$, k+1, 12> |
| < $opc_1$, $dpc_2$, k+2, 5> |

In this example, the tuples having the same OPC and DPC values and the same hour (tuple: <$opc_1$, $dpc_2$, k+1, 34> and tuple: <$opc_1$, $dpc_2$, k+1, 12>) have not been aggregated after map processing (with quantization), because they belong to different "chunk" processing results. However, in other embodiments it may be possible to aggregate such tuples at this phase (or locally, e.g. at the map node) even when they were processed in different chunks or portions.

Figure 8:
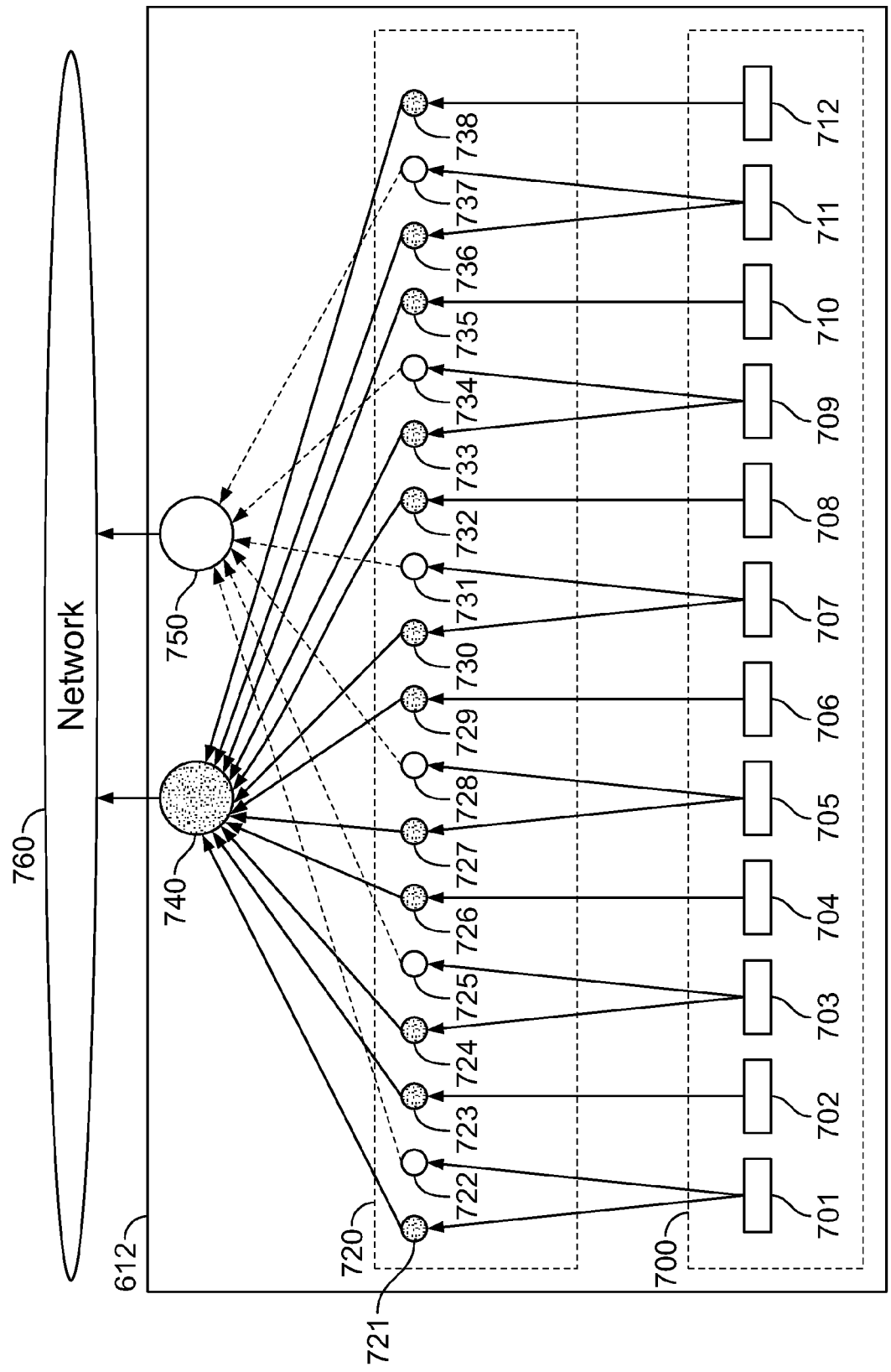
FIG. 8 is a conceptual illustration of quantization mechanism execution, according to embodiments of the invention.

Reference now is made to FIG. 8, which is a conceptual illustration of a quantization mechanism (such as quantization mechanisms 612, 622, 632, 642 from FIG. 7) which may reduce data transmission between a map and a reduce site, according to embodiments of the invention.

FIG. 8 shows records 700, for example, CDR records 701, 702, . . . , 712, to be processed by quantization mechanism 612. In such an example, map SAE 611 may be a database engine at SCP 610 with processing capabilities to perform a map function and its capabilities may further include an ability to quantize using quantization mechanism 612, which may be a process or function of SAE 611. (Quantization mechanisms 622, 632 642, from FIG. 7 may be similarly configured.)

In FIG. 8, each CDR record 701-712 may contain data representing a continuous-value pair, such as ($t_s$, $t_e$). In such an example, map SAE 611 may quantize CDR records 701-712 using the ($t_s$, $t_e$) continuous-value pair, where quantizing is based on an hour boundary. For example, map SAE 611 may split each CDR record 701-712 into one or more quantization tuples (quanta records) having the following tuple arrangement (or schema):

<OPC, DPC, hour, CCS_time_value>

The quantization may be performed by execution of a sub-query (of the map query) such as:

SELECT quantizeByHour(cdr.*) FROM CDR_streams (60) cdr

In this query example, "SELECT" is an SQL statement used to request items of data. Results from the function "quantizeByHour( )" are requested. quantizeByHour( ) may provide the quantization mechanism. This function may receive CDR data (CRD tuples) that have a start-time and end-time specified in milliseconds (for example <$opc_1$, $dpc_2$, $t_1$, $t_2$>) and the function may return quantization tuples having quantized values (for example <$opc_1$, $dpc_2$, h (hour), CCS_time_value$_1$> and <$opc_1$, $dpc_2$, h+1, CCS_time_value$_2$>.

A function such as "quantizeByHour( )" may be a "table value function" (or "set return function"). A table value function is a function that receives a tuple item of data, such as a CDR tuple and returns a set of tuples, such as the tuples that may be created from quantization. Map SAE 611 may include programming extensions to allow for the use and execution of table value functions.

quantizeByHour( ) operates on CDR record data. In the query example above, "FROM" is an SQL statement that specifies where the database engine is to search for data. In the example above, the statement "FROM CDR_streams(60)" provides the data. CDR_streams( ) is a "stream source function" that may provide data from the data stream during a window period. A stream source function may extend the function of a database engine to allow it to process stream data. For example, CDR_streams(60) delivers tuples from the CDR data stream having time stamps that fall in one minute (60 second) time windows. In one embodiment, CDR_streams(60) may be called many times during a processing cycle and the function may return CDR data for processing record-by-record or tuple-by-tuple. The results are sent, using the cdr.* variable to quantizeByHour( ).

Map SAE 611 may execute a sub-query like that shown above. Execution of the sub-query may result in the creation of a plurality of quantization tuples (quanta records) 720, such as tuples 721-738. As shown in FIG. 8, quantizing CDR record 701 yields two tuples, e.g. 721, 722, whereas quantizing CDR record 702 yields one tuple 723. It is possible that quantizing a data record may result in generating of multiple quantization tuples (quanta records) such as three or more, depending for example on the range of the continuous-value data and the boundaries selected for quantization.

In FIG. 8, exemplary aggregated tuples are shown at 740 and 750 (generated for example using a grouping criterion such as grouping by quanta value). In such an example, map SAE 611 may then transfer aggregated tuples 740, 750 using, e.g., telecommunications system STPs (shown as "network" 760 in FIG. 8) to the appropriate reduce SAEs, e.g. 651, 661 (FIG. 7).

One example of a $CQ_{map}$, incorporating a quantization mechanism, may be the following:

```
SELECT qcdr.OPC, qcdr.DPC, qcdr.hour, SUM(qcdr.CCS) FROM
  (SELECT quantizeByHour(cdr.*) FROM CDR_streams(60) cdr;
GROUP BY qcdr.OPC, qcdr.DPC, qcdr.hour;
```

The line from the query above:
(SELECT quantizeByHour(cdr.*) FROM CDR_streams (60) cdr)
may perform the quantization function. Just as in the previous example, "SELECT" is a SQL language statement used to request quantization tuples from "quantizeByHour( )". "FROM" is a SQL language that specifies the location of the records. "CDR_streams(60)" is a function that may provide data from the stream for a 60 second interval. The results line above may have the arrangement (schema):
i) OPC (call origin),
ii) DPC (call destination),
iii) Hour (a quanta value, from quantization), and
iv) CCS (a time value in CSS units)
The lines from the query above:

```
SELECT qcdr.OPC, qcdr.DPC, qcdr.hour, SUM(qcdr.CCS) and
GROUP BY qcdr.OPC, qcdr.DPC, qcdr.hour,
``` may perform aggregation at the map node. For example, this part of the query (compiled and stored at a map node) may receive quantization tuples in the form <OPC, DPC, Hour, CCS> from the performance of the quantization function (see above). For tuples having the same OPC, DPS and Hour values (the quantization tuples being "GROUPED" according to the grouping criterion), the map node will sum (using "SUM(qcdr.CCS)) on the CCS values.

The output of this query may be aggregated tuples such as:

```
<opc1, dpc2, 01, 16.41>
<opc1, dpc2, 02, 24.00>
<opc1, dpc2, 03, 5.22>
...
``` which results may be transferred the reduce nodes.

Example Continuous-Value Relations in Data

When a record contains more than one continuous-value data relation, multiple-quantization mechanisms can be used to quantize the record according to multiple continuous-value relations. Further, in additional embodiments, it may also be possible to create continuous-value relations for records from single attributes of data.

In one embodiment, a regular relation R may be transformed into a continuous-value relation (CVR) $R_c$ with continuous-value attributes, where each attribute value of CVR may be a value range expressed by a value pair. For example, a derived CDR may have the following attributes:
<OPC, DPC, start-time, end-time>
The CDR may memorialize a call from an originating EO (identified by OPC) to a destination EO (identified by DPC) going, for example, from millisecond 3500000 to 4100000. In embodiments of the invention, such a CDR may be transformed to a CVR tuple, t, with attributes <OPC, DPC, call-period>, where the values may be transformed to:
<[opc, opc], [dpc, dpc], [3500000, 4100000]>
Then given quantization functions $F_1$ $F_2$, $F_3$ for quantizing each attribute value-pair to corresponding sets $S_{caller\ (opc)}$, $S_{callee\ (dpc)}$, $S_{hour\_of\_day}$, it may be possible to quantize each of the attributes in the tuple to discrete quantized values following the relationships below:
$F_1$: [opc, opc]→{opc} (opc, opc quantizes to opc)
$F_2$: [dpc, dpc]→{dpc} (dpc, dpc quantizes to dpc)
$F_3$: [3500000, 4100000]→{$H_1$, $H_2$} (time quantizes to two possible H values)
In such quantization, a set of "quantum" tuples of t, denoted as $Q_t$ may be defined as:

$$Q_t = S_{caller\ (opc)} \times S_{callee\ (dpc)} \times S_{hour\_of\_day}$$

where $Q_t$ may be a Cartesian product set of all possible combinations of $S_{caller\ (opc)}$ $S_{callee\ (dpc)}$ and $S_{hour\_of\_day}$ and may have the following instances:

```
<opc, dpc, H1>
<opc, dpc, H2>
```

From this example, it is possible to see that a record containing any type of data can be transformed into a tuple that expresses each of the data items as continuous-value relation pairs. Thus, any type of tuple data may be mapped to continuous-value relation pairs and then quantized.

Example Semantics

Formal semantics of quantization may in one embodiment be expressed as follows. A continuous value in a given domain may be expressed as a pair [$d_1$, $d_2$] denoting a-range D, where $d_1$, $d_2 \in$ D ($d_1$ and $d_2$ are "members of" D). Here, a non-continuous value d may be treated as a singleton range [d, d].

A continuous-value relation (CVR) may be defined on continuous-valued range attributes $R_1$, $R_2$, ..., $R_n$. A continuous-valued range attribute, $R_a$ may be associated with a domain $D_a$, and each instance $r_a$ of $R_a$ may represent a range that may be expressed by a value pair of $D_a$. In general, for each $r_a \in R_a$ (for each $r_a$ that is a member of $R_a$), $r_a$=(d, d') (each $r_a$ is made of values (d, d')) and d, d' $\in D_a$ (d, d' are members of $D_a$).

A quantization function $F_a$ may be a multi-valued discretization function that maps a range value $r_a \in R_a$ to a set (the set can be a singleton) of discrete values in another domain, say $Q_a$, such that:
$F_a(r_a) \subseteq Q_a$ (the result of the function $F_a(r_a)$ is a subset of $Q_a$)

In summary, given a CVR, R, with continuous-valued attributes $R_1$, $R_2$, ..., $R_n$, may be transformed to a quantize relation Q defined on $Q_1 \times Q_2 \times ... \times Q_n$, (Cartesian product set of all possible combinations of $Q_1$, $Q_2$, ... $Q_n$) where quantization is made by a list of quantization functions $F_1$, $F_2$, ..., Fn. In those functions, $F_1$ may map $R_i$ to a quantization domain $Q_i$, such that for a tuple:
<$r_1$, $r_2$, ... $r_n$> $\in$ R (the tuple <$r_1$, $r_2$, ..., $r_n$> is a member of R) where $r_i \in R_i$ ($r_i$ is a member of $R_i$); and $F_1(r_1) \times F_2(r_2) \times \ldots \times F_n(r_n) \subseteq Q$ (the Cartesian product of the results of the functions $F_1(r_1), F_2(r_2), \ldots F_n(r_n)$ is a subset of Q)

The approach of quantization and local aggregation may significantly reduce the data shuffled from map sites to reduce sites. The quantization mechanism may play an important role for data reduction, and thus for network traffic reduction, in distributed (and/or parallel) stream processing.

Example Quantization Mechanism Execution

Figure 9:
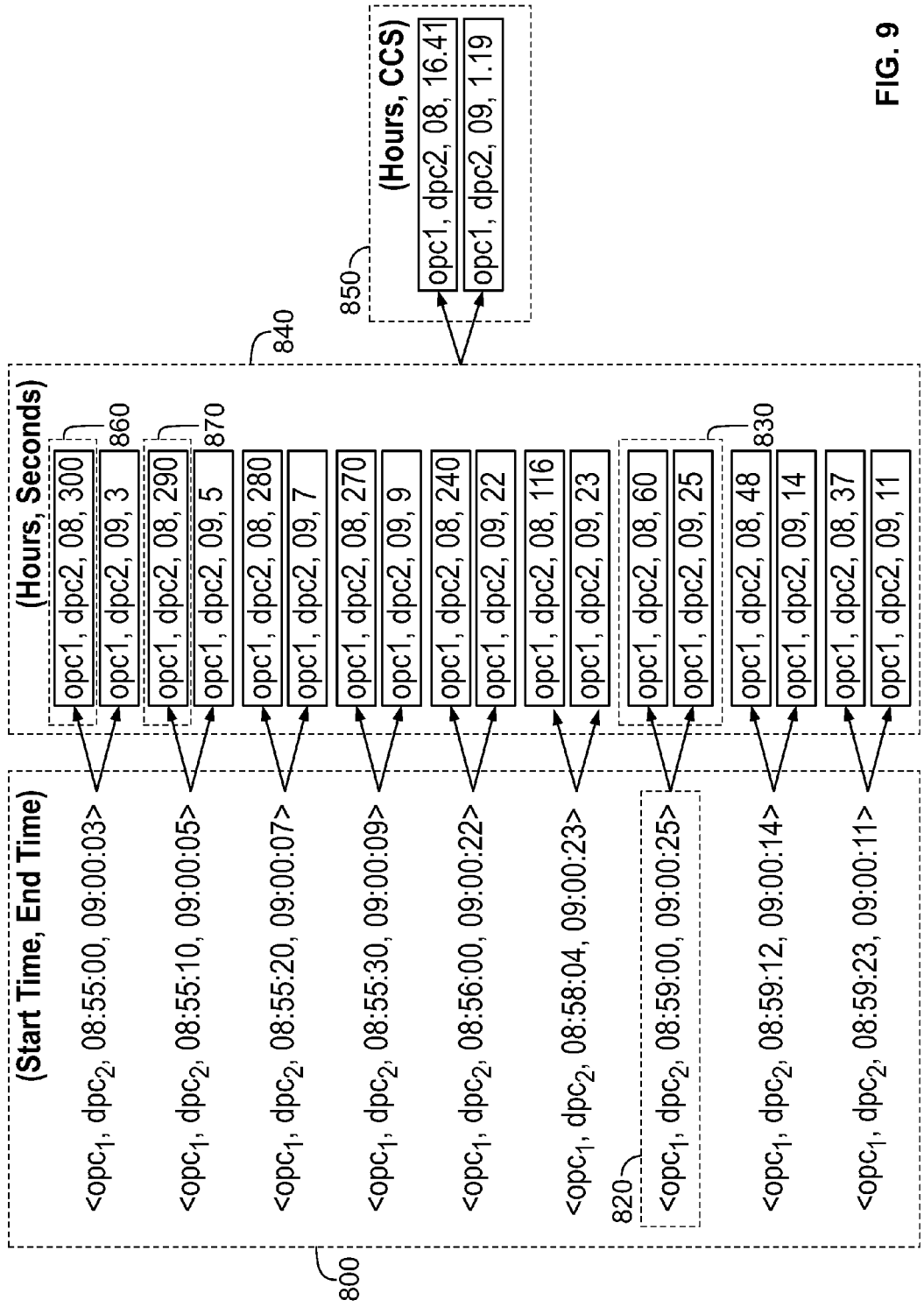
FIG. 9 is a conceptual illustration of quantization mechanism execution on call-detail records, according to embodiments of the invention.

Reference is now made to FIG. 9, which is a conceptual illustration of an example quantization mechanism execution, according to embodiments of the invention. List 800 shows exemplary tuples from map node processing of CDR records (e.g. the processing of map node 610, FIG. 7). In FIG. 9, each tuple in list 800 has the form <OPC, DPC, start-time, end-time>. As can be seen from list 800, each tuple has the same OPC, and DPC, (each shows "$opc_1$" and "$dpc_2$"), but each tuple also has a different call time period that may not be aggregated. However, the time values in each tuple, <start-time, end-time>, in list 800 represent continuous-value pairs concerning time ($t_s$, $t_e$) that may be quantized.

For example, tuple 820 may be quantized and split into the pair of quantization tuples at 830 based on the time values. Tuple 820 has <start-time, end-time> values of 08:59:00, 09:00:25. Using hours 8 and 9 as quanta values (or boundaries) for quantization, 08:59:00 may be quantized to 8 (Hours), 60 (Seconds) as follows. 08:59:00 may be the start time of a call and thus, the call lasted 60 seconds in the hour of 8. That quantized value may be expressed as <08, 60>. At 820, the time 09:00:25 may represent a call end time and that data may be quantized to <9, 25> as the call lasted 25 seconds into the $9^{th}$ hour.

Results from quantizing each tuple in list 800 is shown in list 840. Quantization tuples in list 840 are then aggregated by grouping OPC, DPC and HOUR (e.g. a grouping criterion) to arrive at result 850 containing two aggregated tuples. For example, in list 840 quantization tuple "<opc1, dpc2, 08, 300>" (see 860) and quantization tuple "<opc1, dpc2, 08, 290>" (see 870) match on the OPC, DPC and Hour attributes (the grouping criterion) and thus second values in each tuple can be aggregated to generate the aggregated tuple "<opc1, dpc2, 08, 590>" (a sub-result not shown in FIG. 9). The aggregation process continues for all of the tuples in list 840. Result 850 shows the final output of two aggregated tuples "<opc1, dpc2, 08, 16.41>" and "<opc1, dpc2, 09, 1.91>". The "16.41" and "1.91" values represent aggregated "seconds" values (from list 840) that are expressed in units of centum call seconds (CCS) instead of seconds. The change from list 800 (showing nine input records/tuples) to list 850 showing two aggregated tuples indicates a reduction of data. After processing, the map site may need only to transport the two aggregated tuples from result 850, instead of nine records (tuples) from list 800, to the respective reduce sites.

Example Process Flow

Figure 10:
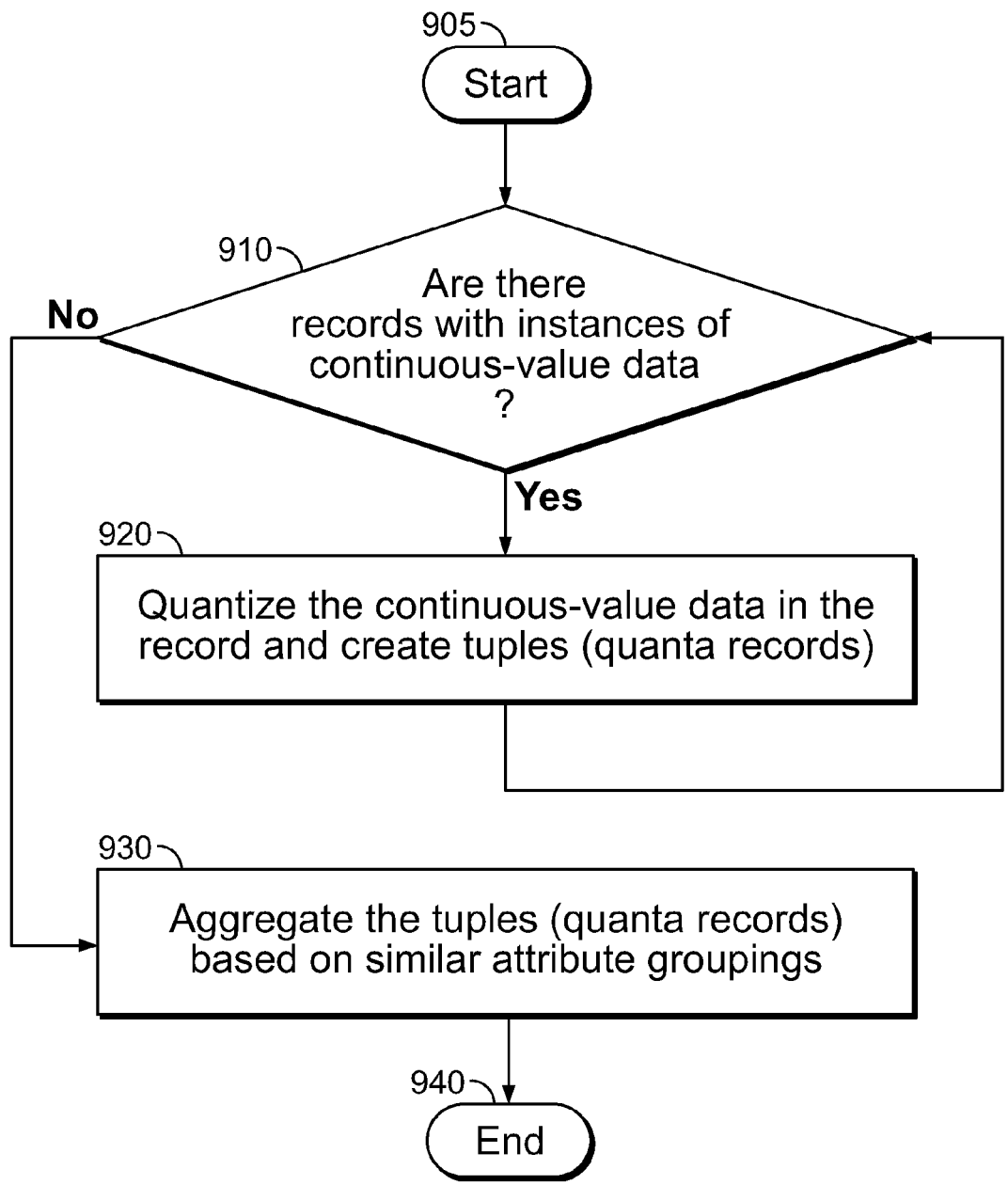
FIG. 10 is a conceptual illustration of a process flow for a quantization mechanism, according to embodiments of the invention.

Reference is now made to FIG. 10, which is a conceptual illustration of a process flow for a quantization mechanism, according to embodiments of the invention. In step 910, a processor executing a database engine, such as a map SAE (e.g. 611, 621, 631, 641, FIG. 7), may begin processing loops to process each instance of continuous-value data in each record to be processed. In step 920, the processor may quantize continuous-value data such as <start-time, end-time>, and, in quantizing, the processor may split the record, creating two or more quantization tuples (quanta records) based on a boundary value that may fall within the range of the continuous value data. Quantization in step 920 may be performed for each instance of continuous-value data in the record. Because one tuple may have more than one instance of continuous-value data (or the tuple may have been transformed into a tuple completely consisting of CVRs), quantization step 920 may result in the creation of multiple quantization tuples (quanta records). In step 930, the processor may return to step 910 to further process more instances of continuous-value data in the same record or the processor may begin to quantize data in a new record. In one embodiment, when all records have been processed, the processor may proceed to step 940 to aggregate the quantization tuples, based, for example on groupings of similar attributes found in tuples (a grouping criterion). When all the tuples have been aggregated, a set of aggregated tuples are generated and processing ends in step 950.

In one embodiment, before the processor may begin step 910, the processor executing map SAE (e.g. 611, 621, 631, 641, FIG. 7), may create tuples containing continuous-valued relations CVRs from data found in the records being processed. Thereafter, the processor may proceed to steps 910-950 to quantize each of the created CVR tuples.

Additional Considerations

Some embodiments of the invention may be implemented, for example, using a machine-readable medium or article which may store an instruction or a set of instructions that, if executed by a machine, cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, target code, compiled code, interpreted code, executable code, static code, dynamic code, or the like, and may be implemented using any suitable high-level, low-level, object-oriented, visual, compiled and/or interpreted programming or query language, e.g., SQL, (such as that run by servers like Oracle, Microsoft SQL server, IBM DB2, Sybase, MySQL, PostgreSQL, Teradata, Infomix, Ingres) and programming languages like C, C++, Java, BASIC, Pascal, Fortran, Cobol, assembly language, machine code, or the like.

Embodiments of the invention may include apparatuses for performing the operations herein. These apparatuses may be specially constructed for the desired purposes, or they may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROM), random access memories (RAM), electrically programmable read-only memories (EPROM), electrically erasable and programmable read only memories (EEPROM), magnetic or optical cards, or any other type of media suitable for storing electronic instructions, and capable of being coupled to a computer system bus.

The processes presented herein are not inherently related to any particular computer or other processing apparatus. Various general-purpose computing systems may be used with programs in accordance with the teachings herein, or it may prove convenient to construct a more specialized processing apparatus to perform the desired method. The desired structure for a variety of these systems will appear from the description below. In addition, embodiments of the invention are not described with reference to any particular programming and/or query language. It will be appreciated that a variety of programming and/or query languages may be used to implement the teachings of the invention as described herein.

In the previous discussion, various figures, diagrams, flowcharts, models, and descriptions are presented as different means to effectively convey the substances and illustrate different embodiments of the invention that are proposed in this application. It shall be understood by those skilled in the art that they are provided merely as illustrative samples, and shall not be construed as limiting the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for processing data, comprising:
   quantizing a portion of the data at a first node within a distributed database processing system to generate one or more quantization tuples;
   aggregating the tuples at the first node to create a plurality of aggregated tuples; and
   transmitting the aggregated tuples to a second node within the distributed database processing system.

2. The method of claim 1, wherein the data comprise one or more records.

3. The method of claim 2, wherein said quantizing occurs on continuous-value data found in the records.

4. The method of claim 1, wherein the data comprise a data stream.

5. The method of claim 1, wherein the data comprise a bounded data set.

6. The method of claim 1, wherein said quantizing occurs through the execution of a query.

7. A system for processing a plurality of records, the system comprising:
   a first node comprising a processor, said node configured to receive a subset from the plurality of records;
   a second node comprising a processor, said second node connected to the first node; and
   a quantization mechanism executable by the processor of the first node,
   wherein the quantization mechanism quantizes instances of data within a record of the subset received at the first node to create a quantization tuple, and
   wherein the processor of the first node aggregates the created quantization tuple with at least one other quantization tuple to create an aggregated tuple which is transmitted to the second node.

8. The system of claim 7, wherein the first node is a map node and the second node is a reduce node within a distributed map-reduce processing system.

9. The system of claim 8, wherein the map-reduce processing system is query-based.

10. The system of claim 7, wherein first node is arranged to execute a map function as part of a distributed map-reduce process.

11. The system of claim 10, wherein the map function comprises the quantization mechanism.

12. The system of claim 7, wherein the first node is one of a plurality of map nodes and the second node is one of a plurality of reduce nodes, said pluralities of map and reduce nodes being arranged to execute a map-reduce process.

13. The system of claim 12, wherein the plurality of map nodes execute in parallel following a predetermined cycle for processing.

14. The system of claim 7, operating as part of distributed data processing network, with each processor of the first and second nodes executing a database engine for performing a map-reduce process, and
   wherein the database engine of the first node performs a map function using the quantization mechanism.

15. The system of claim 7, wherein the first and second nodes are nodes within a network of a telecommunications system.

16. The system of claim 15, wherein the first node is one of a plurality of map nodes and the second node is one of a plurality of reduce nodes, said pluralities of map and reduce nodes being arranged to execute a distributed map-reduce process in the telecommunications system.

17. The system of claim 15, wherein the plurality of records comprise call-detail records generated by the telecommunications system.

18. The system of claim 15, wherein the first and second nodes comprise service control point nodes in a telecommunications signaling network.

19. A non-volatile machine-readable medium having stored thereon instructions that, if executed by a machine, result in:
   quantizing a portion of data at a first node within a distributed database processing system to create a plurality of tuples;
   aggregating the tuples at a map node to create a plurality of aggregated tuples; and
   transmitting the aggregated tuples to a second node within the distributed database processing system.

20. The machine-readable medium of claim 19, wherein the data comprises a plurality of records and said quantizing occurs on multiple instances of continuous-value data found in each record.

* * * * *